(12) United States Patent
MacGillivray et al.

(10) Patent No.: US 9,296,343 B2
(45) Date of Patent: Mar. 29, 2016

(54) RESTRAINING DEVICE

(71) Applicant: Canada Post Corporation, Ottawa, ON (CA)

(72) Inventors: Todd MacGillivray, Ottawa (CA); Cathy Janveau, Ottawa (CA); Yves Bedard, Gatineau (CA); Rod Muir, South Mountain (CA); Torrin Mullins, Ottawa (CA); Phil Streets, Ottawa (CA); Luc Boucher, Ottawa (CA); Mike Sirois, Ottawa (CA); Peter Wells, Ottawa (CA)

(73) Assignee: Canada Post Corporation, Ottawa (CA)

( * ) Notice: Subject to any disclaimer, the term of this patent is extended or adjusted under 35 U.S.C. 154(b) by 316 days.

(21) Appl. No.: 13/621,976

(22) Filed: Sep. 18, 2012

(65) Prior Publication Data

US 2013/0068914 A1    Mar. 21, 2013

(30) Foreign Application Priority Data

Sep. 20, 2011   (CA) .................................... 2753232

(51) Int. Cl.
  *F16B 2/10*       (2006.01)
  *B60R 11/06*      (2006.01)
  *B60R 11/00*      (2006.01)

(52) U.S. Cl.
  CPC ......... *B60R 11/06* (2013.01); *B60R 2011/0071* (2013.01); *F16B 2/10* (2013.01)

(58) Field of Classification Search
  USPC ............. 248/221.11, 222.11, 222.51, 222.52, 248/226.11, 227.3, 227.4, 230.1, 230.4, 248/230.6, 231.51, 231.71; 24/457, 500, 24/508, 509, 510
  See application file for complete search history.

(56) References Cited

U.S. PATENT DOCUMENTS

| | | | |
|---|---|---|---|
| 663,628 A | 12/1900 | Hiett | |
| 858,492 A | 7/1907 | Ward | |
| 858,907 A | 7/1907 | Potterf | |
| 2,181,520 A | 11/1939 | Pedersen | |
| 2,191,858 A | 2/1940 | Moore | |
| 2,292,170 A * | 8/1942 | Starkloff | ........................ 248/273 |
| 2,462,536 A | 2/1949 | Muter | |
| 2,469,865 A | 5/1949 | Crow | |
| 2,473,146 A | 6/1949 | Hunt | |
| 2,665,466 A * | 1/1954 | Morgan | ........................ 24/565 |
| 2,819,110 A | 1/1958 | Redmon | |
| 2,997,767 A * | 8/1961 | Grover et al. | ................... 24/510 |

(Continued)

OTHER PUBLICATIONS

Office Action for U.S. Appl. No. 13/490,583, dated Aug. 30, 2013, 13 pages.

*Primary Examiner* — Alfred J Wujciak

(74) *Attorney, Agent, or Firm* — Michael Best & Friedrich LLP

(57) ABSTRACT

Many tools and other items include a shaft. A restraining device is disclosed for restraining such an item when the item is not in use. In one embodiment, the restraining device includes at least one of: (i) a thumb-receiving surface for receiving a force by a thumb to pivot an arm open; and (ii) a finger-receiving surface for receiving a force by at least one finger to pivot the arm open. The restraining device may be used in restraining a reaching device in a rural mail carrier's vehicle. An apparatus is therefore also disclosed that, in one embodiment, includes a supporting body securable to a vehicle seat. The supporting body supports a tray for holding mail. The restraining device is connected to the supporting body.

22 Claims, 22 Drawing Sheets

(56) References Cited

U.S. PATENT DOCUMENTS

| | | | |
|---|---|---|---|
| 3,274,657 A * | 9/1966 | Renfroe | 294/104 |
| 3,276,806 A | 10/1966 | Hansen | |
| 3,672,279 A | 6/1972 | Hackenberg et al. | |
| 3,937,512 A | 2/1976 | Baughman | |
| 3,990,735 A | 11/1976 | Starz | |
| 4,023,843 A | 5/1977 | Coons | |
| 4,037,868 A | 7/1977 | Baker | |
| 4,160,563 A | 7/1979 | Whitney | |
| 4,622,868 A | 11/1986 | Flannigan | |
| 4,726,263 A | 2/1988 | Lake | |
| 4,962,957 A | 10/1990 | Traber | |
| 5,305,978 A * | 4/1994 | Current | 248/230.4 |
| 5,556,299 A * | 9/1996 | Finke | 439/479 |
| 5,857,723 A | 1/1999 | Mathieu et al. | |
| 6,189,190 B1 | 2/2001 | Gillet et al. | |
| 6,460,910 B2 | 10/2002 | Prass | |
| 6,669,254 B2 | 12/2003 | Thom et al. | |
| 6,820,906 B1 | 11/2004 | McClendon | |
| 7,077,372 B2 * | 7/2006 | Moran | 248/222.11 |
| 7,080,863 B2 | 7/2006 | Cappellano et al. | |
| 7,226,098 B1 | 6/2007 | Moreira | |
| 7,229,055 B2 * | 6/2007 | Wallther | 248/211 |
| 7,380,336 B2 | 6/2008 | Bennett et al. | |
| 7,513,856 B2 * | 4/2009 | Jones | 482/107 |
| 8,006,711 B2 * | 8/2011 | Pietrzak et al. | 135/75 |
| 8,087,707 B1 | 1/2012 | Hawkins et al. | |
| 2005/0040661 A1 | 2/2005 | Hsu | |
| 2006/0162502 A1 | 7/2006 | Huang | |
| 2007/0044281 A1 * | 3/2007 | Witzel et al. | 24/455 |
| 2013/0068914 A1 | 3/2013 | MacGillivray et al. | |
| 2013/0193289 A1 * | 8/2013 | Goffman | 248/231.51 |
| 2014/0050571 A1 * | 2/2014 | Sauerhoefer et al. | 415/182.1 |

* cited by examiner

RESTRAINING DEVICE

CROSS-REFERENCE TO RELATED APPLICATIONS

The following application claims the benefit of Canadian Patent Application No. 2,753,232, which was filed on Sep. 20, 2011, and is hereby incorporated by reference in its entirety.

FIELD

This application relates to a restraining device for restraining or holding an item having a shaft, such as a broom, shovel, garden tool, or reaching device.

BACKGROUND

Many tools and other items include an elongated shaft that acts as an extension separating the handling end of the device from the end of the device that has the apparatus thereon for performing the function of the device. Examples of such items include brooms, garden tools, shovels, umbrellas, and reaching devices. Other items, such as guns and hooks, often include a shaft as part of their structure.

It is generally desired to store and secure such items when not in use.

Depending upon the physical environment in which the item is used and stored, there may be unique constraints on the room available for storing the item and/or the way in which the item is secured.

Consider, for example, the following scenario. A rural mail carrier often services a rural mail box by driving up to the mail box, which is typically at the end of a laneway at the side of the road. However, the mail box is usually located on the passenger's side (curb side) of the vehicle, which means that it is sometimes difficult for the mail carrier to reach the mail box while seated in the driver's seat. In such situations, the mail carrier may use a reaching device in order to reach a rural mail box while remaining seated in the driver's seat. When not in use, the reaching device needs to be stored in the vehicle, preferably in a manner that is safe, while still being easily accessible.

SUMMARY

A restraining device is disclosed for restraining an item that is not in use. In one embodiment, the restraining device is used for restraining a reaching device in a rural mail carrier's vehicle. An apparatus is also disclosed that, in one embodiment, includes a supporting body securable to a seat of a vehicle. The supporting body is for supporting a tray for holding mail. The restraining device is connected to the supporting body.

BRIEF DESCRIPTION

Embodiments will now be described, by way of example only, with reference to the accompanying figures wherein.

Like reference numerals are used in different figures to denote similar elements.

DETAILED DESCRIPTION

The embodiments set forth herein represent the necessary information to enable those skilled in the art to practice the claimed subject matter and illustrate the best mode of practicing such subject matter. Upon reading the following description in light of the accompanying figures, those skilled in the art will understand the concepts of the claimed subject matter and will recognize applications of these concepts not particularly addressed herein. It should be understood that these concepts and applications fall within the scope of the disclosure and the accompanying claims.

Referring first to FIGS. 1 to 8, one embodiment of a restraining device 2 is shown. For ease of reference, the restraining device 2 in this embodiment will be referred to as a "holder" 2. The term "holder" is being used because it holds, or assists in holding, a shaft of a device, object or other item in the manner explained herein. By "holding" it is not necessarily meant that the holder 2 actively grips and supports the item being held, although it may do so in some embodiments. More generally, the holder 2 will assist in restraining the item. Therefore, "holder" as used herein can be considered interchangeable with "retraining device", and the act of "holding" can be considered interchangeable with the act of "restraining".

Figure 1:
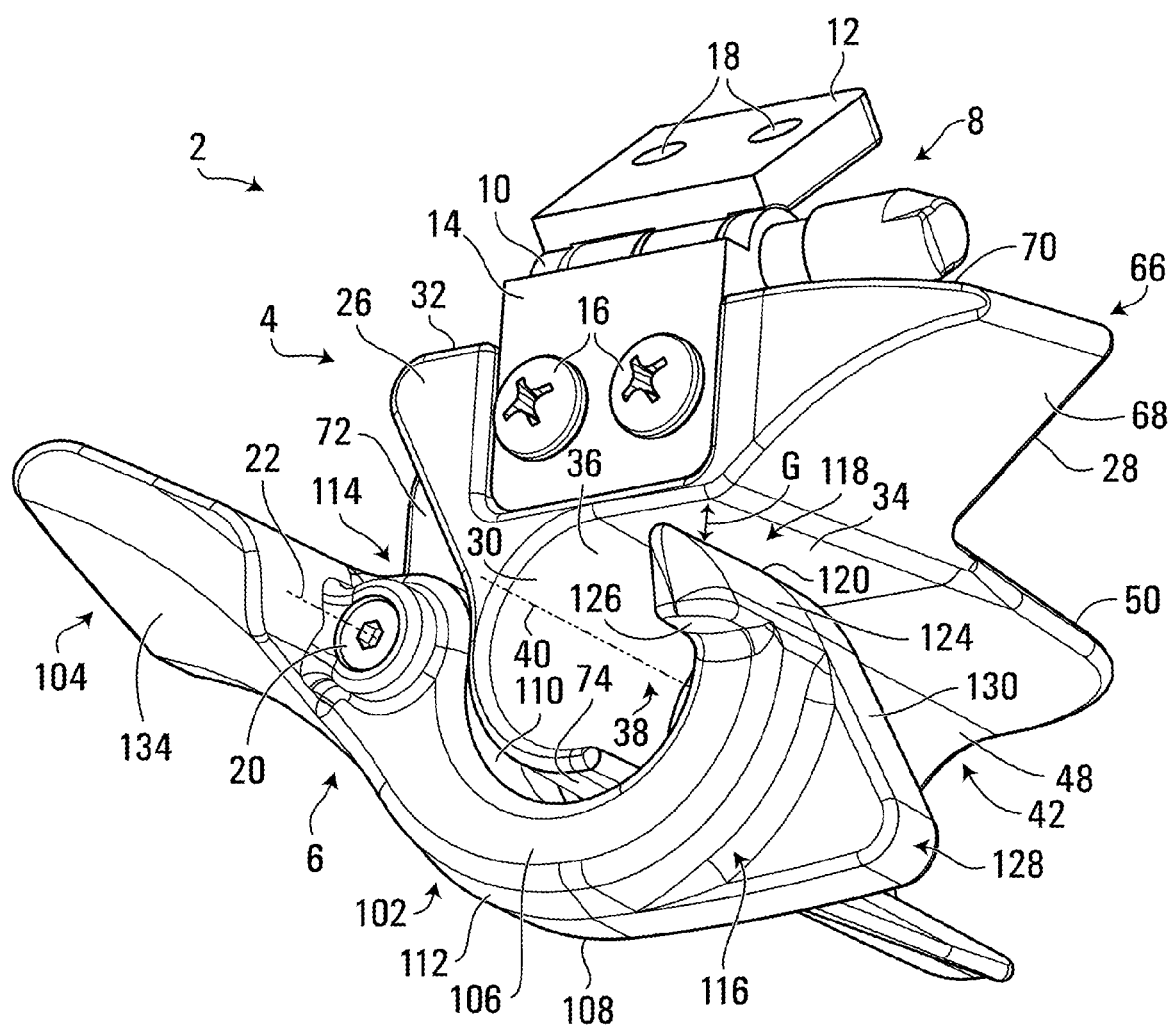
FIG. 1 is a perspective view of one embodiment of a restraining device, illustrating an arm in a closed position.
Figure 2:
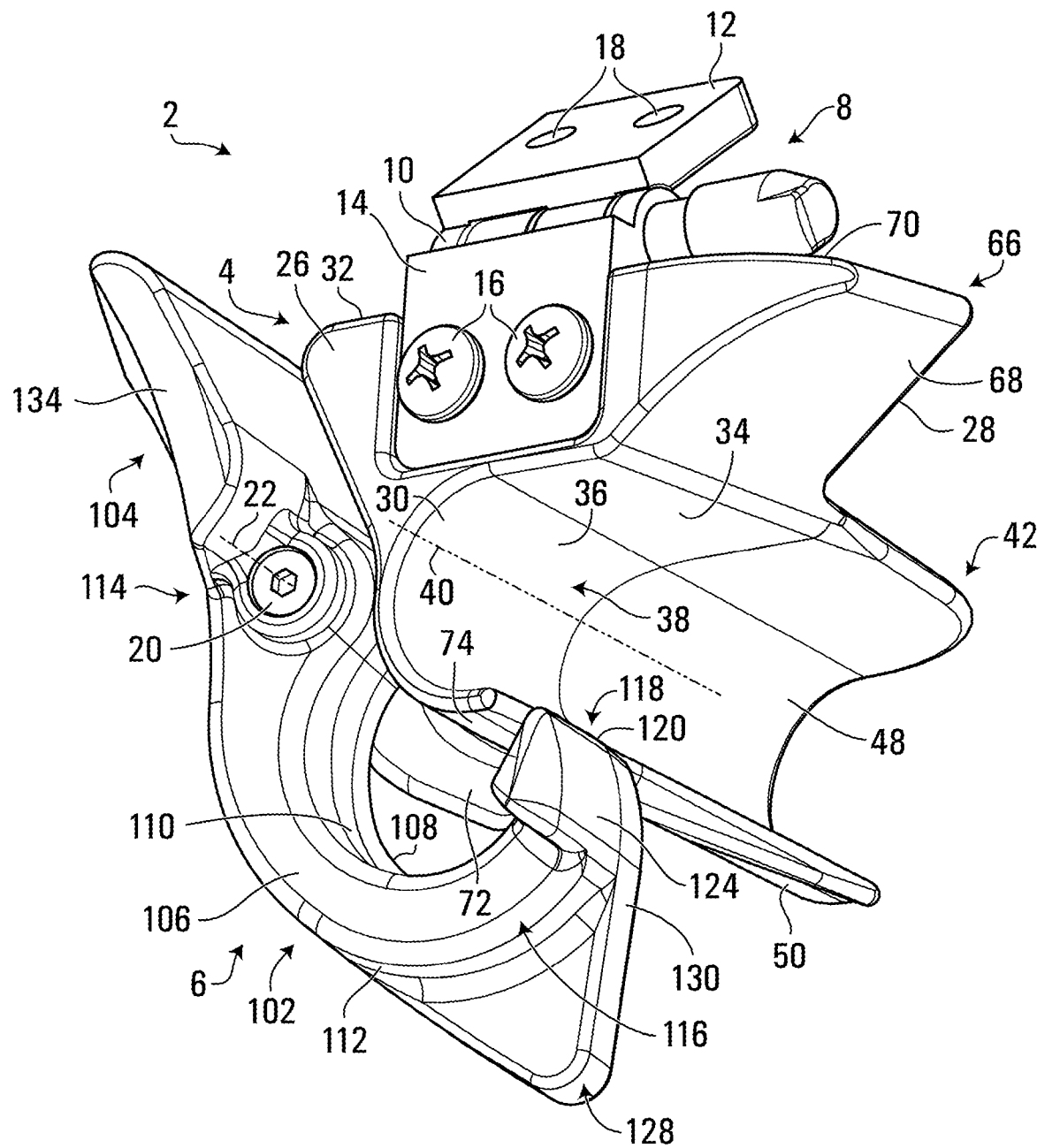
FIG. 2 is the view of FIG. 1, but illustrating the arm in an open position.
Figure 3:
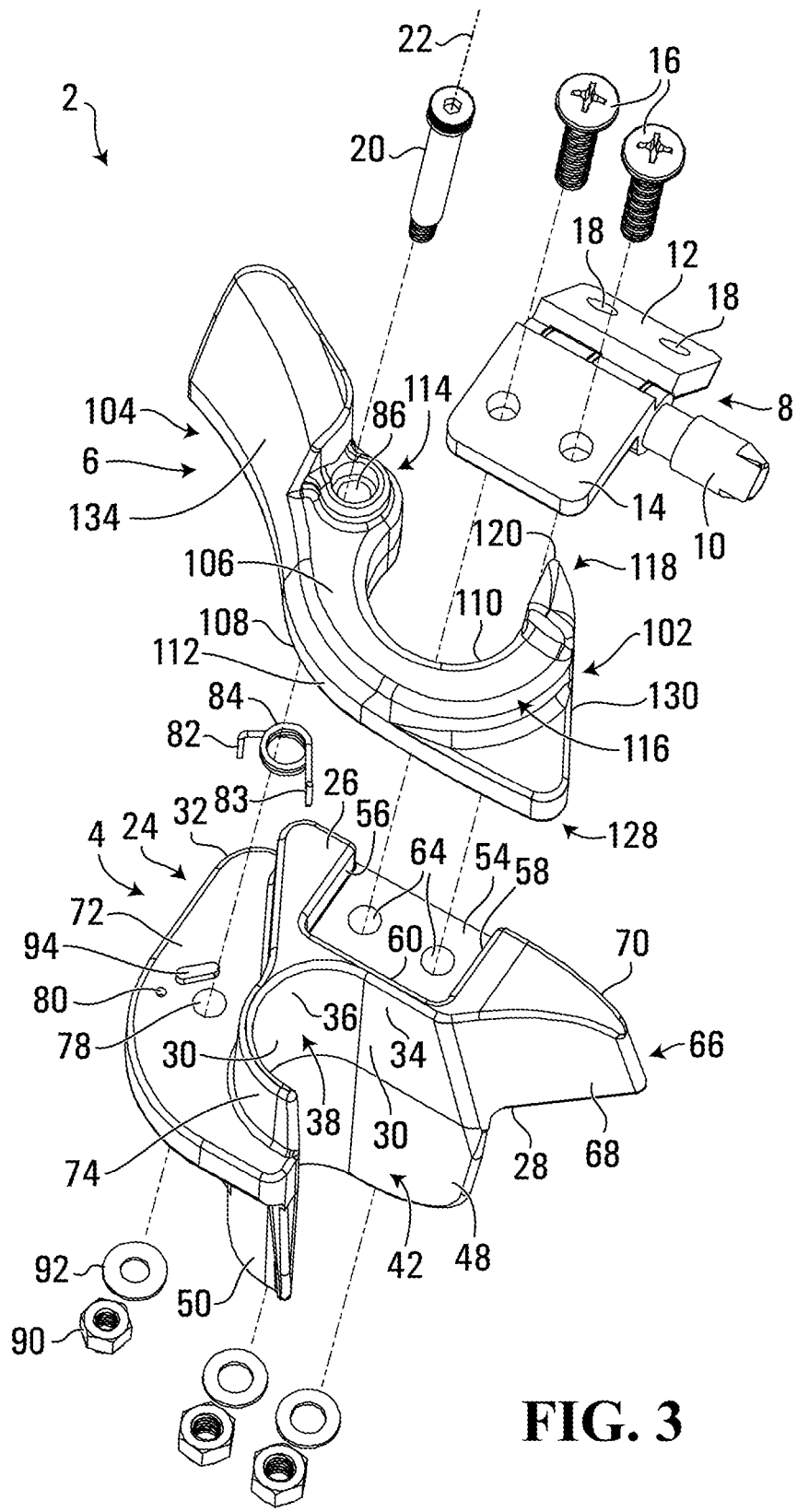
FIG. 3 is an exploded view of the restraining device of FIG. 1.

Turning therefore to the figures, FIG. 1 illustrates a perspective view of the holder 2 in the closed position, and FIG. 2 illustrates a perspective view of the holder 2 in the open position. FIG. 3 illustrates an exploded view of the holder 2. As is best illustrated in these figures, the holder 2 comprises a base 4 and an arm 6 movably connected to the base 4. The base 4 is secured to a supporting surface (not shown). In the illustrated embodiment, the base 4 is secured via a hinge 8, although other ways of securing the base 4 are possible. For example, the base 4 may be fixedly secured to the supporting surface or integrally formed with the supporting surface.

The hinge 8 comprises a hinging portion 10 and two mounting plates 12 and 14 connected on opposite sides of the hinging portion 10. One of the mounting plates 14 is bolted to the base 4 of the holder 2 using bolts 16, and the other opposite mounting plate 12 is secured to the supporting surface (not shown) using bolts or screws (not shown) that are inserted through orifices 18 in the mounting plate 12.

In the illustrated embodiment, the arm 6 is pivotally connected to the base 4 via a pin 20, and the arm 6 pivots around this pin 20, which defines a pivoting axis 22. Specifically, the arm 6 pivots around the pivoting axis 22 between the closed position (FIG. 1) and the open position (FIG. 2). More generally, the arm 6 can be movably connected (i.e. not necessarily pivotally connected) to the base 4, in which case there may not be a pivoting axis. For example, the arm 6 may instead slide between the open position and the closed position. However, in the embodiments illustrated herein, the arm 6 is shown as pivotally connected in the manner explained herein.

The base 4 of the holder 2 will now be described in more detail. The base 4 can be seen in FIGS. 1 to 4, but is also shown in isolation in FIGS. 5 to 8, which respectively illustrate a perspective view, side view, end view, and top view of the base 4.

Figure 4:
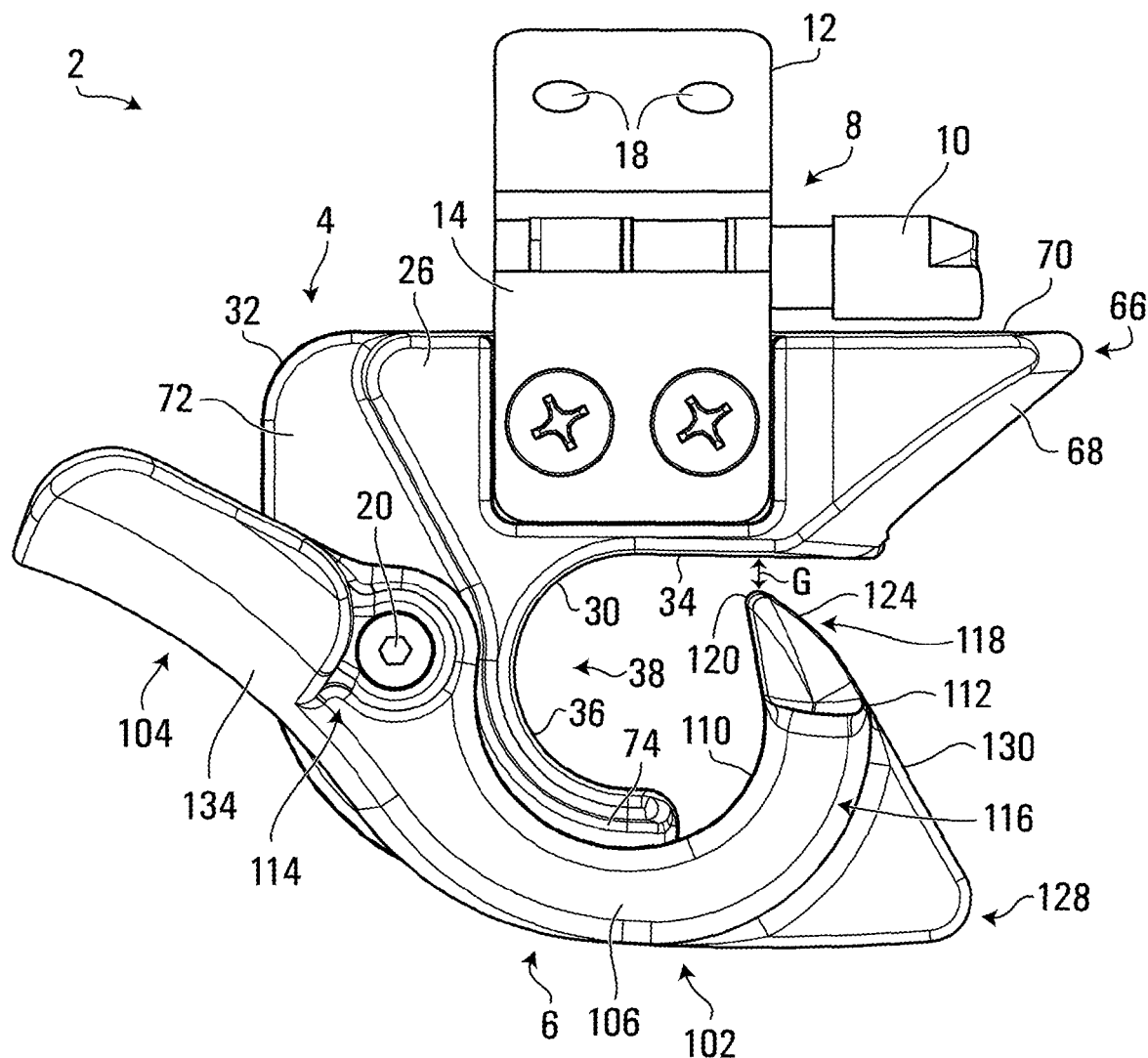
FIG. 4 is a top view of the restraining device of FIG. 1.
Figure 5:
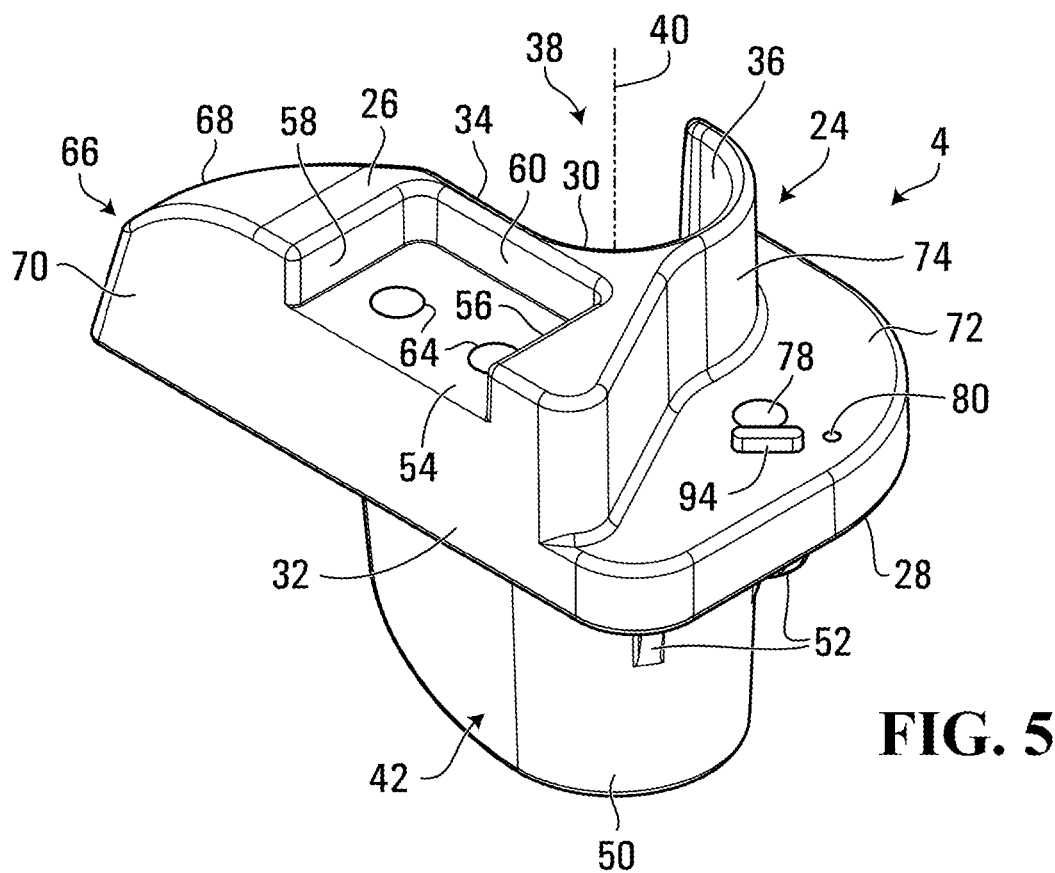
FIG. 5 illustrates the base of the restraining device of FIG. 1 in isolation.

As is best illustrated in FIG. 5, the base 4 comprises a body 24, which in the illustrated embodiment is generally J-shaped and has an upper face 26, a lower face 28, an inner side surface 30, and an outer side surface 32. The inner side surface 30 includes a planar portion 34 and an arcuate portion 36. As is best illustrated in FIG. 2, the arcuate portion 36 defines a channel 38, which in the illustrated embodiment is in an elongated channel that has a cupped shape. The elongated channel 38 is for receiving a shaft of a device, object or other item to be held by the holder 2. The shaft is not illustrated in FIGS. 1 to 8, but will be illustrated and described later with reference to FIGS. 9 to 13. The elongated channel 38 has a longitudinal axis 40, which is substantially perpendicular to the direction in which the channel 38 opens.

The channel 38 is specifically illustrated as elongated and defined by an arcuate surface. However, this is only the illustrated example embodiment. More generally, the channel is the structure of the holder 2 for receiving the shaft to be held by the holder 2. The channel may, for example, instead be a groove, an indent, or any shaped surface defined in or by the base 4 and/or the arm 6, which is adapted to receive the shaft. Therefore, in general, the channel will be defined by at least one of the base and the arm. For example, the base itself may define the channel (as shown in the illustrated embodiment in which the channel is defined in the base 4), or instead the arm itself may define the channel, or instead a combination of both the base and arm may define the channel.

With reference again to FIG. 2, the arcuate portion 36 and planar portion 34 of the inner side surface 30 extend downward away from the lower face 28 of the body 24 so as to form a guard 42. The guard 42 of the illustrated embodiment therefore also includes a planar portion and an arcuate portion.

Figure 6:
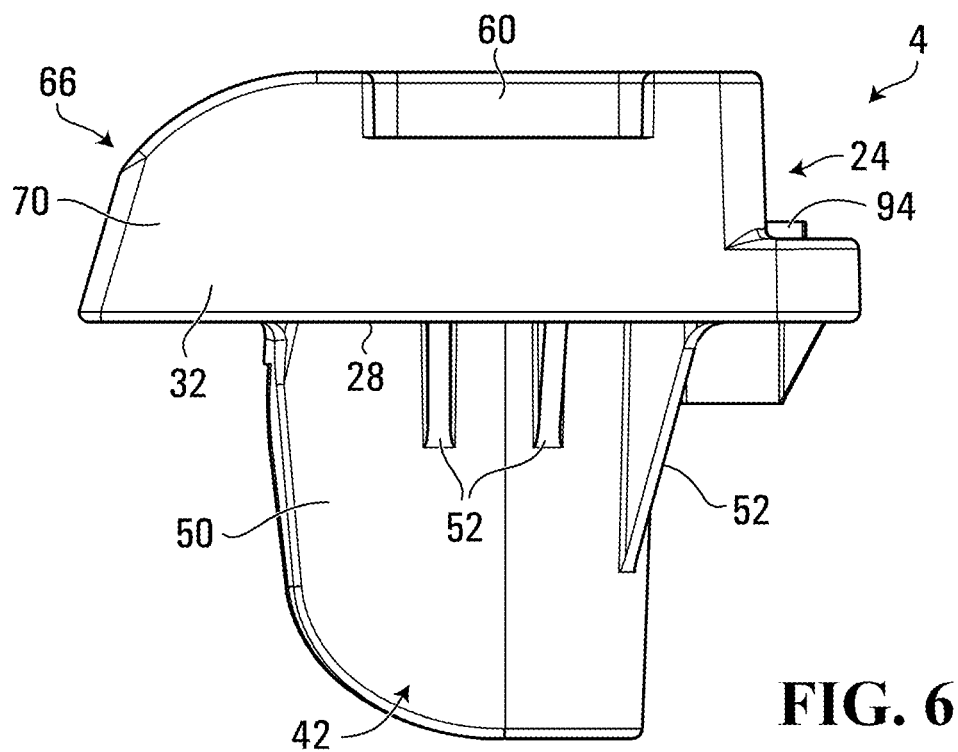
FIG. 6 is a side view of the base of FIG. 5.
Figure 7:
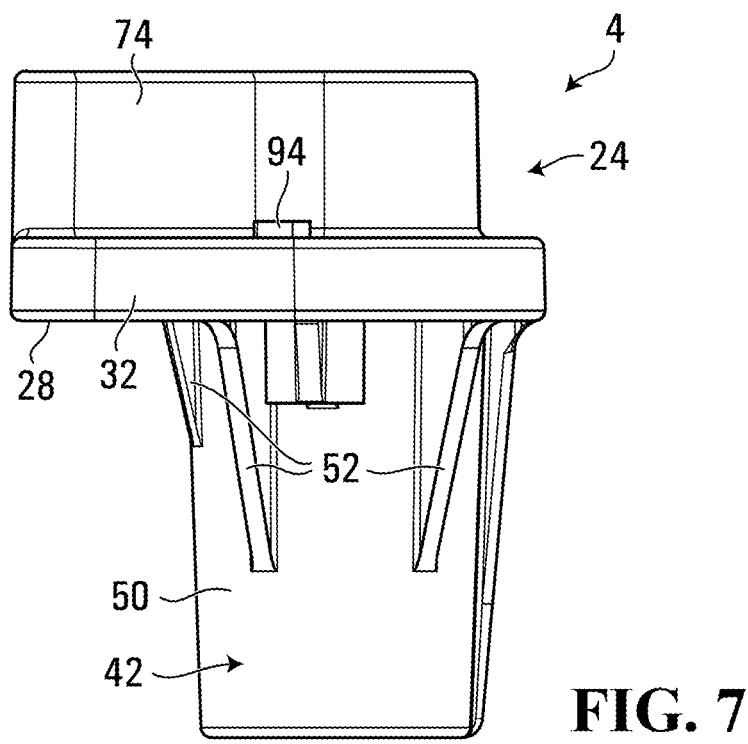
FIG. 7 is an end view of the base of FIG. 5.
Figure 8:
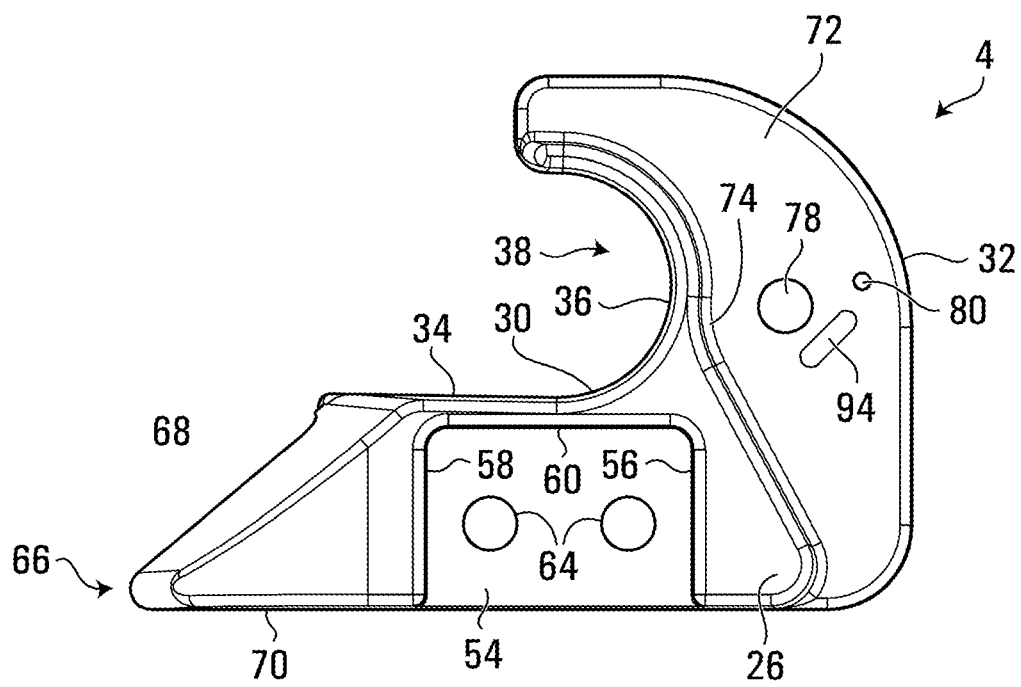
FIG. 8 is a top view of the base of FIG. 5.

More generally, the guard 42 comprises a guarding surface having an inner surface 48, and an opposite outer surface 50. The outer surface 50 of the guard 42 is illustrated most clearly in FIGS. 5 to 7. As shown in these figures, the outer surface 50 of the guard 42 includes a plurality of supporting fins 52 horizontally spaced along the outer surface 50 of the guard 42. Each supporting fin 52 is generally triangular in shape with one leg of the supporting fin 52 extending downward along the outer surface 50 of the guard 42 in a direction generally parallel to the longitudinal axis 40 of the elongated channel 38 (shown in FIG. 5), and with the other leg of the supporting fin 52 extending at a right angle along the lower face 28 of the body 24 in a direction away from and generally radial to the longitudinal axis 40 of the elongated channel 38. The hypotenuse of the supporting fin 52 extends between the ends of the legs. As is best illustrated in FIGS. 6 and 7, the supporting fins on the arcuate portion of the guard 42 are generally larger than those on the planar portion of the guard 42. The supporting fins 52 assist in reinforcing the J-shaped body 24.

As is best shown in FIG. 1, the guard 42 is specifically illustrated as comprising an arcuate inner guarding surface 48, which is integrally formed with the arcuate surface 36 defining the elongated channel 38 of the base 4. However, this is only the illustrated example embodiment. More generally, the guard 42 may comprise a differently-shaped surface, a protrusion, bar, and/or an object that restrains movement of the shaft, such as in the manner explained later with reference to FIGS. 12 and 13. Therefore, the guard 42 need not necessarily be curved or specifically positioned where it is shown in the illustrated embodiment.

Also, in the illustrated embodiment, the guard 42 is described as separate from the channel 38, although the arcuate inner guarding surface 48 of the guard 42 is integrally formed with the arcuate surface 36 defining the elongated channel 38. However, the guard 42 may instead form part of the channel. In any case, the guard 42 will typically be positioned such that it constrains movement of a portion of a shaft held in the holder in one direction away from the longitudinal axis of the channel more than in another direction away from the longitudinal axis of the channel, when a shaft is received in the channel and loosely restrained by the arm in the closed position, as explained later with reference to FIGS. 12 and 13. In some embodiments, the guard is positioned such that it extends away from the base and such that at least a portion of the guard and at least a portion of the inner surface of the arm are on opposite sides of the longitudinal axis of the channel when the arm is in the closed position, such as in the embodiment shown in FIG. 1. In some embodiments, the guard is offset from and below the opposite portion of the inner surface of the arm when the arm is in the closed position, as also shown in FIG. 1. In some embodiments, the channel is defined by opposite ends, each on either side of a plane perpendicular to the longitudinal axis of the channel, and the arm (when in the closed position) is closer to one of the opposite ends of the channel. If the channel 38 in FIG. 1 is defined as also including the arcuate inner guarding surface 48 of the guard 42, then the arm (when in the closed position) is closer to the top end of the channel than the opposite bottom end of the channel.

Returning to the figures, and specifically FIG. 3, in the illustrated example embodiment, the upper face 26 of the body 24 of the base 4 has a rectangular depression 54 defined therein for receiving the mounting plate 14. The depression 54 is defined by two sidewalls 56 and 58 and an inner sidewall 60. The inner sidewall 60 is adjacent to and immediately opposite the planar portion 34 and the beginning of the arcuate portion 36 of the inner side surface 30 of the body 24. The side of the depression 54 opposite the inner sidewall 60 is open to allow the mounting plate 14 to be inserted into the depression 54. The bottom of the depression 54 includes two orifices 64 that extend through the body 24. The orifices are for receiving the bolts 16, which are used in attaching the mounting plate 14 to the body 24. The depth of the depression 54 is substantially equal to the thickness of the mounting plate 14, such that the upper surface of the mounting plate 14 is substantially flush with the upper face 26 of the body 24 when the mounting plate 14 is installed, such as is shown in FIGS. 1 and 2.

As is best shown in FIG. 3, the body 24 of the base 4 further comprises a guide 66, which in the illustrated embodiment is generally triangular in shape and extends at an oblique angle from the planar portion 34 of the inner side surface 30 in a direction away from the opening of the elongated channel 38. The guide 66 is integrally formed with the body 24 of the base 4 and extends vertically between the upper face 26 and lower face 28 of the body 24. The guide 66 comprises two side surfaces 68 and 70, which respectively form part of the inner surface 30 and outer surface 32 of the body 24. The inner side surface 68 of the guide 66 is for guiding a shaft of a device or other item to be held by the holder 2 into the elongated channel 38. The inner side surface 68 of the guide 66 may be slightly curved in some embodiments.

More generally, the guide 66 can comprise any guiding surface that extends from the base in a direction away from the channel (such as channel 38) and guides a shaft into the channel. Therefore, for example, the guide 66 does not necessarily have to be generally triangular in shape, but can be any shape, and does not have to extend vertically between the upper face 26 and the lower face 28 of the body 24. The guide 66 could instead be, for example, a protruding surface or object that directs the shaft into the channel. The guide 66 specifically illustrated in the figures is just one example.

With reference again to FIG. 3, in the illustrated embodiment the upper face 26 of the body 24 of the base 4 includes another and larger depression 72 formed therein that is for receiving the arm 6 of the holder 2. This depression 72 is defined by a sidewall 74 that runs across the J-shaped body 24 of the base 4 at the bottom of the "J" from the tip of the "J" to the outer side surface 32 of the body 24 adjacent the depression 54. The depth of the depression 72 is substantially equal to the thickness of the arm 6, such that when the arm 6 is received in the depression 72, the top surface of the arm 6 is generally flush with the upper face 26 of the body 24 of the base 4 (as in FIGS. 1 and 2).

As shown in the exploded view of FIG. 3, the bottom surface of the depression 72 has an orifice 78 defined therein that extends through the body 24. The orifice 78 is for receiving the pin 20 around which the arm 6 pivots. An adjacent smaller orifice 80 is also defined in the bottom surface of the depression 72, which receives one arm 82 of a torsion spring 84. As shown in FIG. 3, during assembly the pin 20 is inserted through an orifice 86 in the arm 6 of the holder 2, then through the circular void defined by the torsion spring 84, and then through the orifice 78 in the depression 72. The pin 20 is partially threaded at its bottom to receive a nut 90. A washer 92 is inserted between the nut 90 and the bottom face 28 of the body 24. The arm 82 of the torsion spring 84 is received in the adjacent smaller orifice 80. Another opposite arm 83 of the torsion spring is connected to the arm 6 of the holder 2. Thus, the torsion spring 84 biases the arm 6 of the holder 2 to remain in the closed position. When the arm 6 is opened by a rotational force, and the rotational force holding the arm 6 open is released, the arm 6 will automatically pivot back to the closed position.

A stop 94 also projects up from the bottom surface of the depression 72. The stop 94 is also adjacent to the orifice 78 and acts as an abutment surface to stop the arm 6 of the holder 2 from opening too far.

The arm 6 of the holder 2 will now be described in more detail. As shown in FIGS. 1 to 4, in the illustrated embodiment the arm 6 comprises a claw 102 and a fin 104, each on opposite sides of the pin 20 around which the arm 6 pivots. The claw 102 is generally C-shaped and comprises an upper surface 106, a lower surface 108, an inner concave side surface 110, and an outer convex side surface 112. The claw 102 includes a base portion 114 at which the claw 102 is pivotally mounted via the pin 20, as well as an opposite top portion 116. The opposite top portion 116 is adjacent to the end 118 of the claw 102. In the illustrated embodiment, the end 118 of the claw is a tip 120 at which the inner side surface 110 and the outer side surface 112 meet.

When the arm 6 is in the closed position, as in FIG. 1, the inner side surface 110 of the claw 102 hugs the sidewall 74 of the depression 72 and extends beyond the sidewall 74 and across the elongated channel 38 towards the inner side surface 30 of the body 24 of the base 4. Therefore, when the arm 6 is in the closed position, a portion of the inner side surface 110 of the arm 6 faces the longitudinal axis 40 of the channel 38 and acts as a stop that restrains a shaft being held/restrained in the holder 2, and helps prevent the shaft from falling out of the elongated channel 38. The shaft is not illustrated in FIGS. 1 to 8, but is shown and described later as shaft 122 in FIG. 10.

With reference to FIG. 1, when the arm 6 is in the closed position, a shaft (not shown in FIG. 1) can be held in the elongated channel 38 by the claw 102 of the arm 6. In some embodiments, the claw 102 may firmly hold the shaft in the elongated channel 38. In other embodiments, the elongated channel 38 may be slightly smaller than the shaft and made of a resilient material, such that the shaft can be snapped into the elongated channel 38 and firmly held therein by the arcuate wall 36 of the channel 38 itself. In such embodiments, the claw 102 would only play a secondary role of assisting in further securing the shaft. Alternatively, in other embodiments, and in the embodiment described later with respect to FIGS. 10 to 13, the shaft may only be loosely held in the elongated channel 38, and is loosely restrained by the claw 102 when the arm 6 is in the closed position. In such embodiments, because the shaft is only loosely held, it may need to be additionally supported at the bottom by another surface (such as a floor). This will be discussed in more detail later.

As is best illustrated in FIG. 4, when the arm 6 is in the closed position, a gap G is present between the end 118 of the claw 102 and the planar portion 34 of the inner side surface 30 of the base 4. Additionally, when in the closed position, the claw 102 is curved slightly near its tip 120 towards the center of the elongated channel 38, such that the outer side surface 112 of the claw 102 adjacent to the tip 120 forms a convex guiding surface 124. As shown in FIG. 1, the guiding surface 124 is slightly elongated in the vertical direction relative to the rest of the claw 102, thereby forming a projection 126 near the tip 120 of the claw 102. As explained later, the guiding surface 124 not only assists in guiding a shaft into the elongated channel 38, but the combination of the gap G and guiding surface 124 allow a shaft to be snapped into the elongated channel 38 of the holder 2.

As is best shown in FIGS. 1 and 2, the claw 102 of the illustrated embodiment also includes a shoulder 128, which extends outwards from the top 116 of the claw 102 away from and approximately perpendicular to the pivoting axis 22 of the arm 6. The shoulder 128 is generally triangular in shape and is integrally formed with the top 116 of the claw 102 adjacent the guiding surface 124. The shoulder 128 is flush with the lower surface 108 of the claw 102, but is offset relative to the upper surface 106 of the claw 102. The shoulder 128 comprises a thumb-receiving surface 130, which is on the side of the shoulder 128 and is connected to and extends from the tip 120 of the claw 102. The thumb-receiving surface 130 acts as a lever. As will be described later, a force applied on the thumb-receiving surface 130 (typically by a thumb) in a direction perpendicular to the pivoting axis 22 of the arm 6 causes the arm 6 to pivot open. As mentioned, the thumb-receiving surface 130 extends to the tip 120 of the claw 102. Therefore, the thumb-receiving surface 130 is connected to (and integrally formed with) the guiding surface 124. As such, the guiding surface 124 may also comprise part of the thumb-receiving surface 130, depending upon the placement of the thumb when opening the arm 6.

Although the thumb-receiving surface 130 is specifically illustrated as being part of the shoulder 128, this is only the illustrated example embodiment. More generally, the shoulder 128 is optional and the thumb-receiving surface 130 can be part of or connected to another portion of the arm 6, such as on or near the end 118 or top 116 of the claw 102.

With reference to FIG. 1, the arm 6 also includes the fin 104, which extends from the base 114 of the claw 102 in the direction substantially opposite the claw 102 and away from the pivoting axis 22. The fin 104 comprises a finger-receiving surface 134, which in the illustrated embodiment is on the side of the fin 104 and faces a direction different from and typically substantially opposite the thumb-receiving surface 130 of the claw 102. By facing "substantially opposite" to each other, it is meant that at least a portion of the thumb-receiving surface 130 and at least a portion of the finger-receiving surface 134 face in opposite enough directions so as to allow both a thumb to apply a force on the thumb-receiving surface 130 and one or more fingers to apply a force on the finger-receiving surface 134 at the same time, such as shown and described later in relation to FIG. 9.

In the illustrated embodiment, the finger-receiving surface 134 is slightly concave so as to more comfortably receive one or several fingers. A force applied on the finger-receiving surface 134 (typically by one or more of the fingers) in a direction perpendicular to the pivoting axis 22 of the arm 6 also causes the arm 6 to pivot open.

The arm 6 is described above and illustrated as comprising a claw 102 having a thumb-receiving surface 130 and a fin 104 having a finger-receiving surface 134. More generally, the arm 6 need not necessarily comprise a claw 102 and/or a fin 104. For example, in other embodiments not illustrated, the portion of the arm 6 extending across the elongated channel 38 may not be claw shaped, but may instead be straight or another shape. Additionally or alternatively, the fin 104 may instead be a protrusion or extension that includes or is itself the finger-receiving surface 134. Also, the arm 6 does not have to include both the thumb-receiving surface 130 and the finger-receiving surface 134. Only one may be present in some embodiments. Any thumb-receiving surface 130 that may be present on the arm 6 is used for receiving a force by a thumb to move the arm from a closed position, in which the arm 6 restrains a shaft in the channel 38, to an open position, in which entry of the shaft into the channel 38 is permitted. In general, this movement may or may not be a pivoting movement depending upon the structure of the arm 6. For example, if the arm 6 slides between an open and closed position, the force by the thumb on the thumb-receiving surface 130 will cause the arm to move open by sliding. Similarly, any finger-receiving surface 134 that may be present on the arm 6 is used for receiving a force by one or more fingers to move the arm from a closed position to an open position. Again, this movement may or may not be a pivoting movement depending upon the structure of the arm 6.

Figure 9:
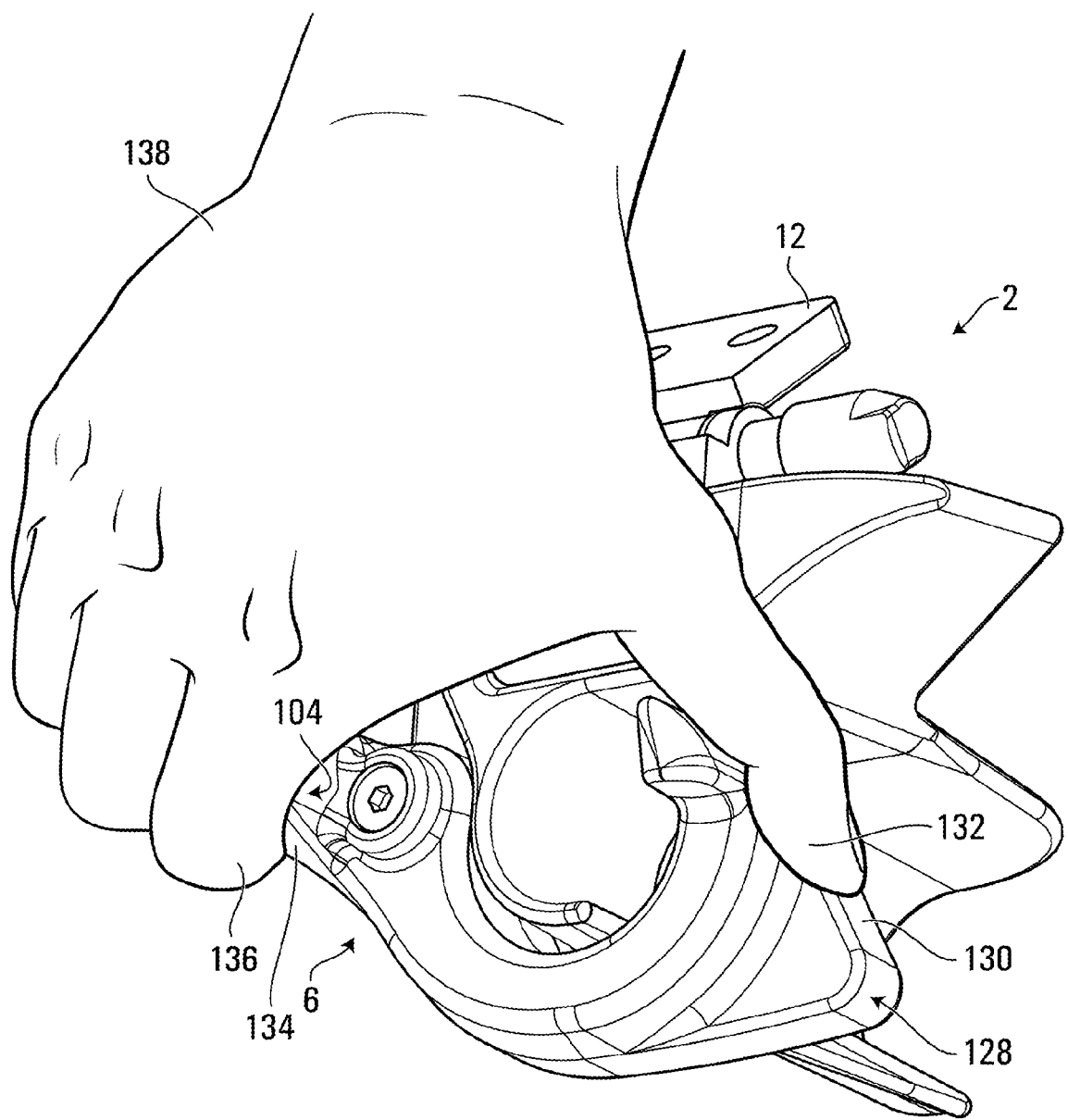
FIG. 9 illustrates a hand opening the restraining device of FIG. 1.

Operation of the holder 2 will now be described with reference to FIGS. 9 to 13. Prior to use, the holder 2 is mounted on a supporting surface (not shown) using mounting plate 12. Then, during use, as shown in FIG. 9, the arm 6 of the holder 2 may be opened by a hand 138 by placing the inside of a thumb 132 of the hand 138 on the thumb-receiving surface 130 of the holder 2, and by placing the inside of one or more fingers 136 of the hand 138 on the finger-receiving surface 134, and then turning the hand 138 to apply a force perpendicular to the pivoting axis of the arm 6 on both the thumb-receiving surface 130 and the finger-receiving surface 134. FIG. 9 illustrates at least three fingers 136 on the finger-receiving surface 134, although more or fewer fingers may be placed on the finger-receiving surface 134, depending upon the size of the person's hand. Additionally, although FIG. 9 illustrates both the thumb 132 and the fingers 136 being used at the same time to simultaneously apply a force to the thumb-receiving surface 130 and the finger-receiving surface 134 respectively in order open the arm 6, in practice only the thumb-receiving surface 130 or the finger-receiving surface 134 needs to be used. Using both at the same time may make it easier for those having an average hand size. Alternatively, using only the finger-receiving surface 134 or the thumb-receiving surface 130 may be easier for some people, particularly when opening the arm 6 and at the same time removing a shaft from the holder 2. Therefore, a benefit of the illustrated embodiment is that either the fin 104 (via the finger receiving surface 134 on the fin 104) or the shoulder 128 (via the thumb-receiving surface 130 on the shoulder 128) may be used to apply a force to open the arm 6. This allows for ease of use by different people having varying hand sizes and varying ways in which they wish to remove a shaft from the holder 2. One or both of the finger receiving surface 134 and the thumb-receiving surface 130 may be used, and if the finger receiving surface 134 is used, one or more fingers 136 may be used to apply the force, depending upon the comfort of the person opening the holder 2.

Figure 10:
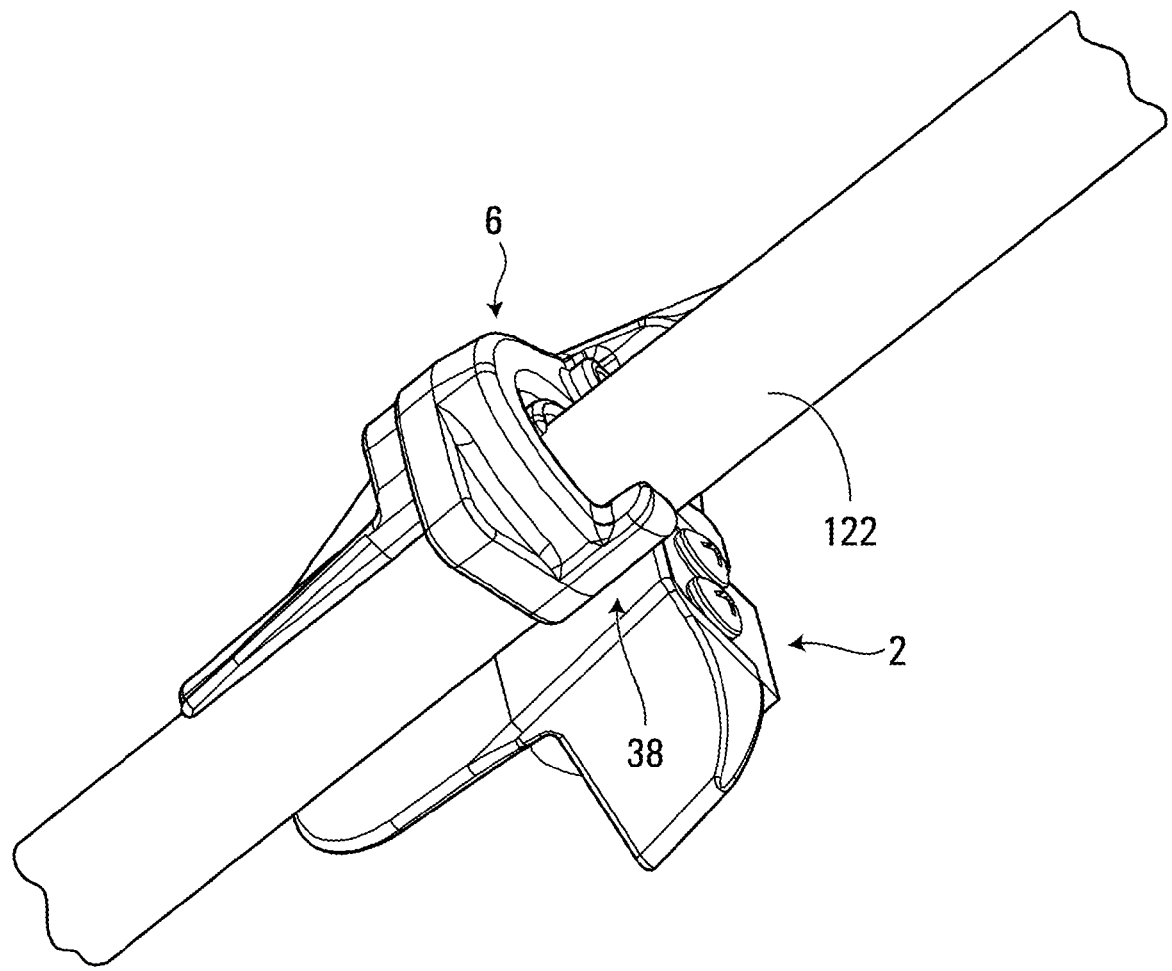
FIG. 10 illustrates a shaft being held in the restraining device of FIG. 1.

FIG. 10 illustrates the holder 2 in the closed position holding a shaft 122 of a device or other item being held by the holder 2. The arm 6 of the holder 2 may be opened to release the shaft 122 as described with reference to FIG. 9. The arm 6 may also be opened as described with reference to FIG. 9 in order to place the shaft 122 into the holder 2. Alternatively, the shaft 122 may be snapped into the holder 2 in the manner described with reference to FIG. 11.

Figure 11:
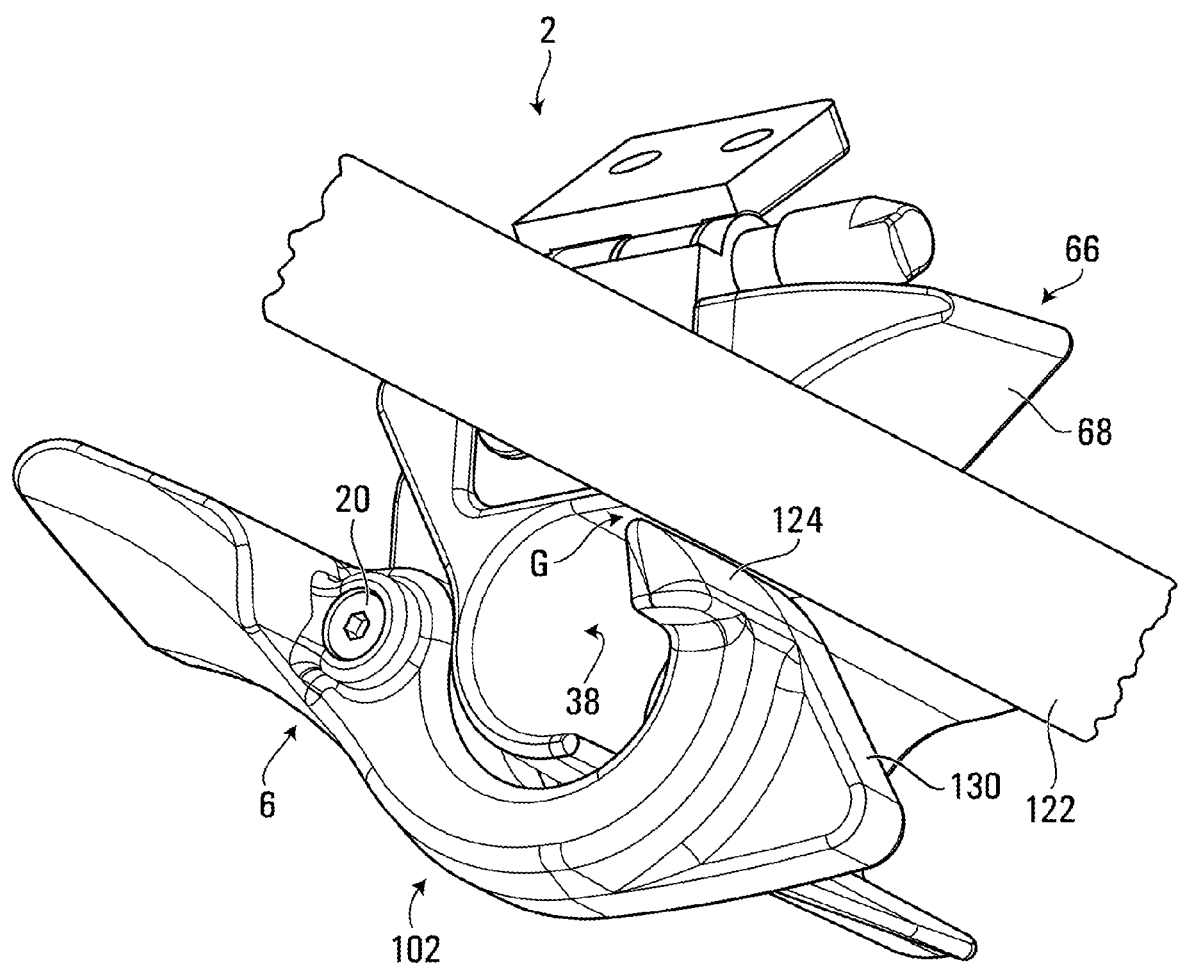
FIG. 11 illustrates a shaft being snapped into the restraining device of FIG. 1.

As shown in FIG. 11, when the arm 6 is in its closed position, the gap G is smaller than the diameter of the shaft 122 to be held, such that when the shaft 122 is guided along the inner side surface 68 of the guide 66 towards the elongated channel 38, it presses against the opposite guiding surface 124 of the claw 102 at the gap G and asserts a force against the guiding surface 124, which produces torque that causes the claw 102 to pivot around the pin 20 and thereby open the arm 6 just enough to receive the shaft 122 into the elongated channel 38 of the holder 2. Because the arm 6 is spring-biased to remain in the closed position (by the torsion spring 84 described earlier with reference to FIG. 3), the arm 6 automatically snaps back to its closed position as soon as the shaft 122 is received in the elongated channel 38. Note that the thumb-receiving surface 130 could itself also act as a guide to guide the shaft 122 towards the guiding surface 124, depending upon the angle at which the shaft 122 approaches the gap G.

More generally, the guiding surface 124 is an example of a shaft-receiving surface adapted to receive a force applied by a shaft being snapped into the channel 38 when the arm 6 is in the closed position. This shaft-receiving surface need not have the specific structure of guiding surface 124, but can be a differently-shaped surface, an object, and/or a protrusion near the end of the arm 6, that has or is a surface that will receive a force applied against the surface by a shaft and transfer or translate this to a force perpendicular to the pivoting axis of the arm 6 so as to cause the arm 6 to pivot open. Even if the arm 6 does not comprise a claw 102, but instead is of another structure (as discussed earlier), the end of the arm 6 may still have the shaft-receiving surface near or adjacent to a gap G.

Returning to FIG. 10, when the arm 6 is in the closed position, the shaft 122 is loosely held in the elongated channel 38. Although not illustrated in FIG. 10, the bottom of the shaft 122 may need to be supported by another surface, such as by a floor. However, because the shaft 122 is loosely held in the holder 2, some movement of the shaft 122 is possible when being held in the holder 2, depending upon the force that is applied. This is described in more detail with reference to FIG. 12.

Figure 12:
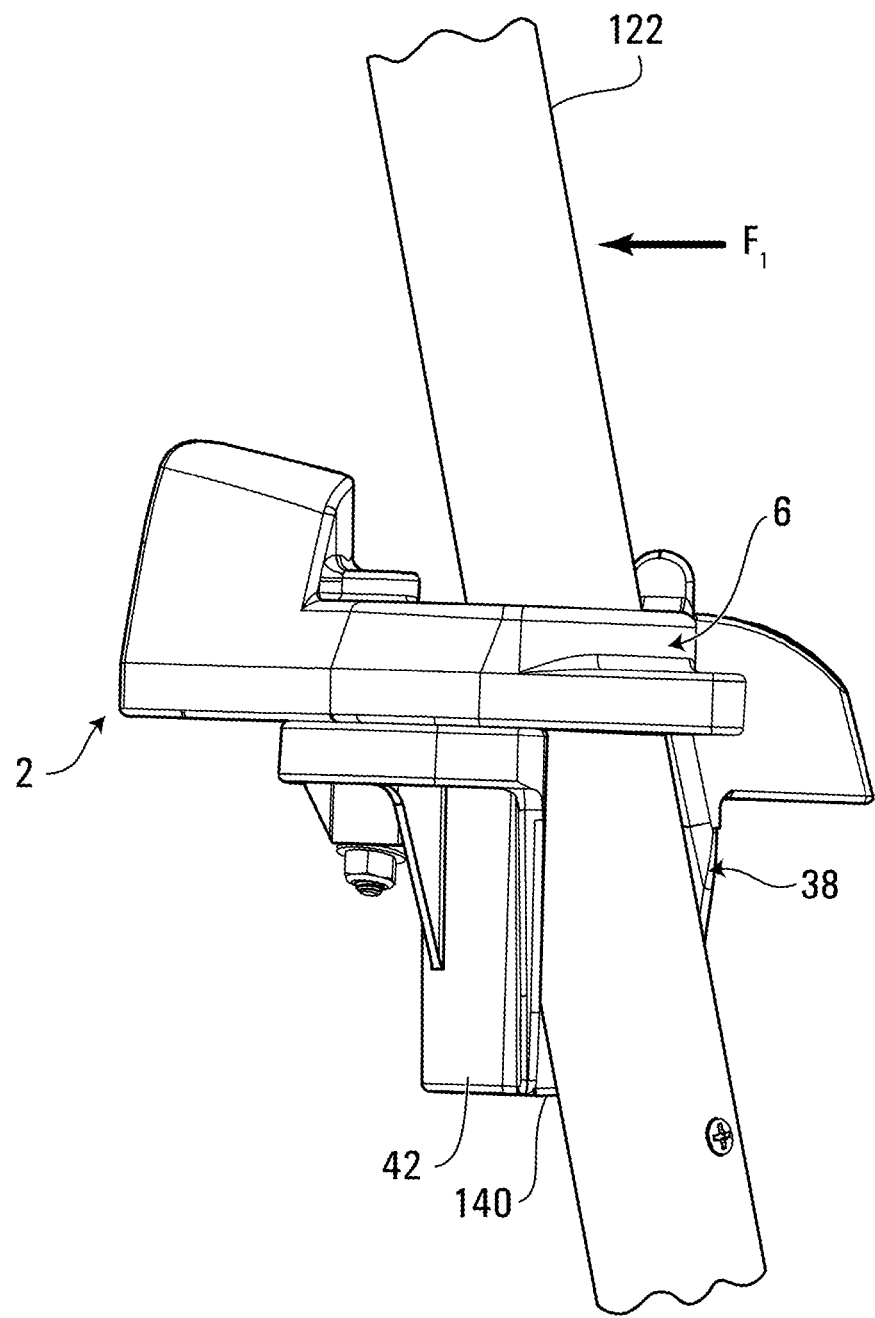
FIG. 12 illustrates a shaft being held in the restraining device of FIG. 1 with a force being applied to a portion of the shaft above the arm.
Figure 13:
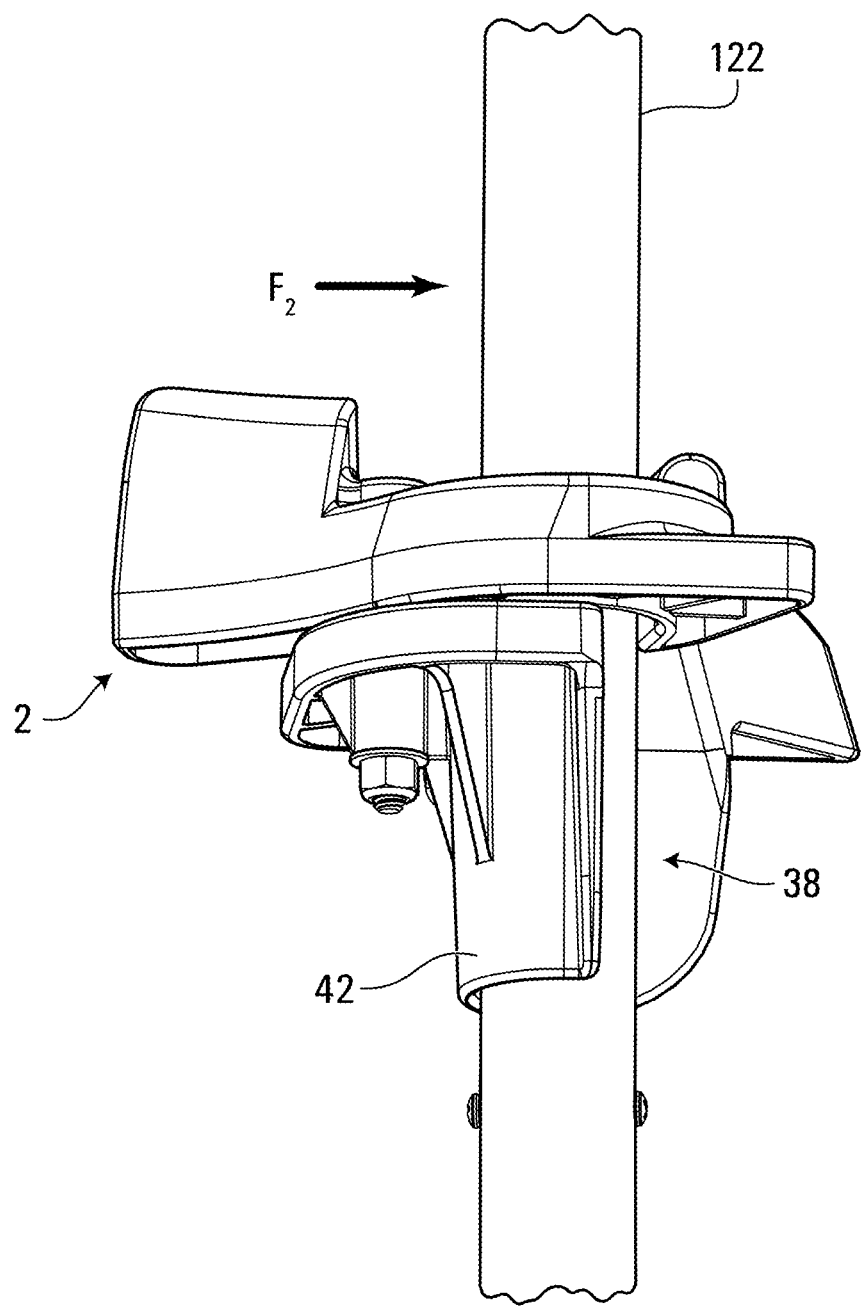
FIG. 13 illustrates the situation of FIG. 12, but with a force being applied in the opposite direction.

As shown in FIG. 12, when the shaft 122 is held in the holder 2 and a force is applied to the shaft 122 at a point above the arm 6 and in a direction opposite the direction in which the elongated channel 38 opens (such as the force shown by arrow F1), the shaft 122 will move, assuming there are no other external objects blocking its movement. This movement will be possible because the shaft 122 is only loosely held and the portion of the shaft 122 adjacent to the guard 42, which is below the arm 6 in the illustrated embodiment, can move away from the guard 42 in the direction in which the channel 38 opens, as shown at 140. Assuming there are no other external objects blocking its movement, upon a large enough force at F1, the shaft 122 should be able to move a substantial distance, e.g., such that the angle between the longitudinal axis of the elongated channel 38 and the longitudinal axis of the shaft 122 is several degrees. On the other hand, as shown in FIG. 13, when a force is applied on the shaft 122 at a point above the arm 6 in a direction in which the elongated channel 38 opens (such as the force shown by arrow F2), the guard 42 will mitigate or constrain movement of the shaft 122. Specifically, the guard 42 will constrain the movement of the portion of the shaft 122 below the arm 6 by mitigating its movement in a direction opposite the direction in which the channel 38 opens. One benefit of this construction is explained later in relation to a specific application in which the holder 2 is used to hold a reaching device in a rural mail carrier's vehicle.

More generally, as is shown in FIGS. 12 and 13, the guard 42 constrains movement of a portion of the shaft 122 in one direction away from the longitudinal axis of the channel more than in another direction away from the longitudinal axis. In FIGS. 12 and 13, the "portion of the shaft 122" is the portion below the arm 6, and the guard 42 constrains movement of this portion of the shaft 122 more in the direction opposite to the direction in which the channel opens. In alternative embodiments and applications (not illustrated), the guard could be in other locations (such as on the arm, or facing in a direction opposite in which the channel opens). In such alternative embodiments, the shaft's movement may be constrained in a different way by the guard, but still such that the movement of the shaft is constrained more in one direction away from the longitudinal axis of the channel than in another.

Since the holder 2 can restrain a shaft of a device, object, or other item, it is envisioned for use in multiple applications. For example, the holder 2 may be used in a garage or a shed for holding a garden tool, or in a closet for holding a broom, or for holding a hook or any other item having a shaft. That being said, a particularly useful application of the holder 2 is in restraining a reaching device in a rural mail carrier's vehicle. To explain this in more detail, the holder 2 will now be described in this specific context, with reference to FIGS. 14 to 24.

Figure 14:
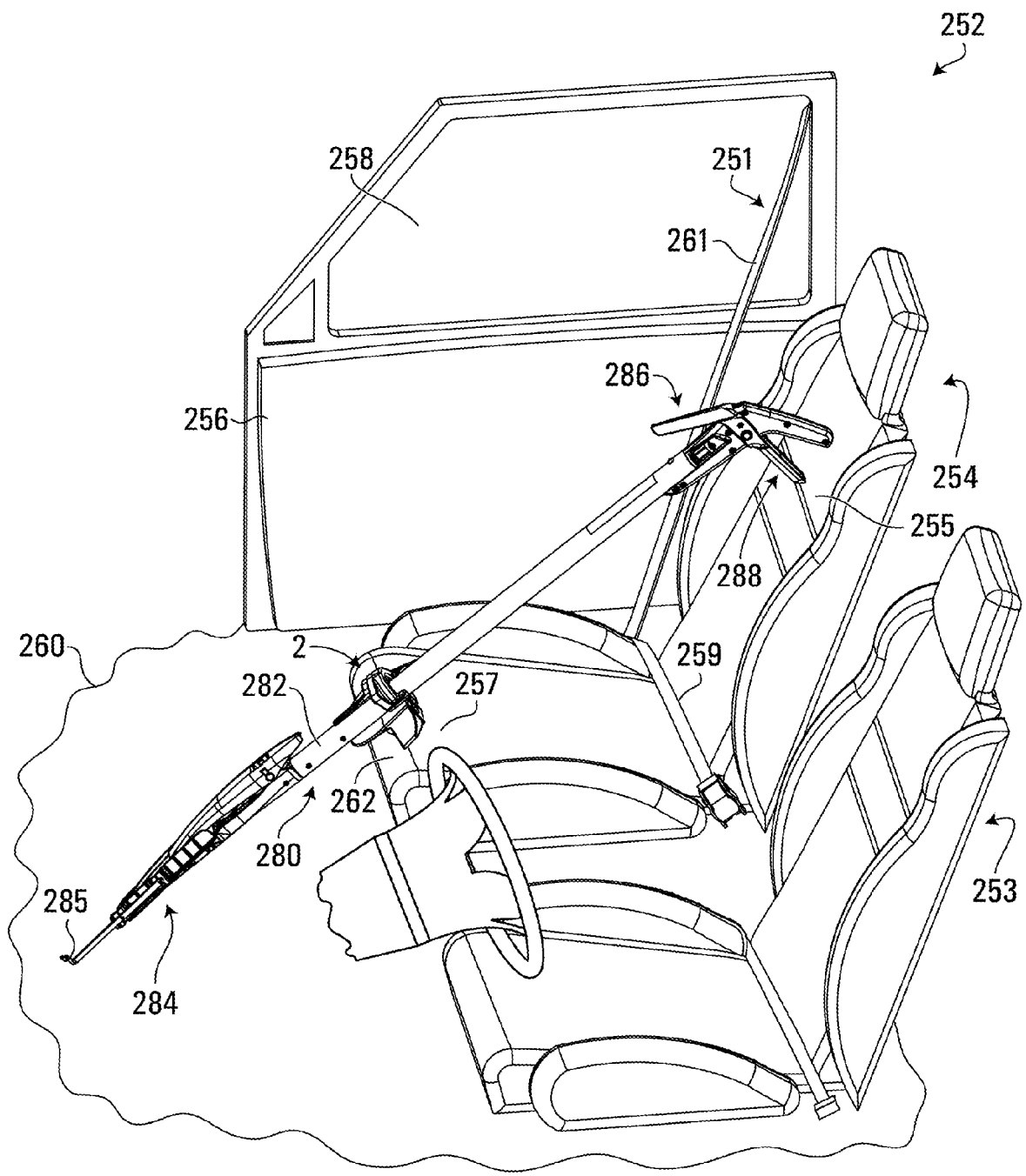
FIG. 14 illustrates a reaching device being held by a restraining device in a vehicle.

Turning first to FIG. 14, a vehicle interior 252 is illustrated, having a driver's seat 253, a passenger's seat 254, a passenger's seat belt 251, a passenger's door 256, a passenger's window 258, and a floor 260. The passenger's seat belt 251 comprises a lap belt 259 and a sash or shoulder belt 261. The passenger's seat 254 has a seat back 255, and a seat base 257, which has a front edge 262. The holder 2 is secured to the front edge 262 of the seat base 257. A reaching device 280 is illustrated as being held by the holder 2. The reaching device 280 includes an elongated member, which in the illustrated embodiment comprises an elongated tube or shaft 282. A jaw 284 is located at a first end of the shaft 282, and a first actuator 286 and a second actuator 288 are located at an opposite second end of the shaft 282. Each one of the first actuator 286 and the second actuator 288 is for opening and closing the jaw 284. Mail (not illustrated) can be placed into the jaw 284. At the end of the jaw 284 is a hook 285. The reaching device 280 is described in detail in U.S. patent application Ser. No. 13/490,583, and Canadian Patent Application No. 2,753,232, which are both incorporated herein by reference.

The shaft 282 of the reaching device 280 is loosely held in the holder 2, such that the jaw 284 rests on the floor 260.

Figure 15:
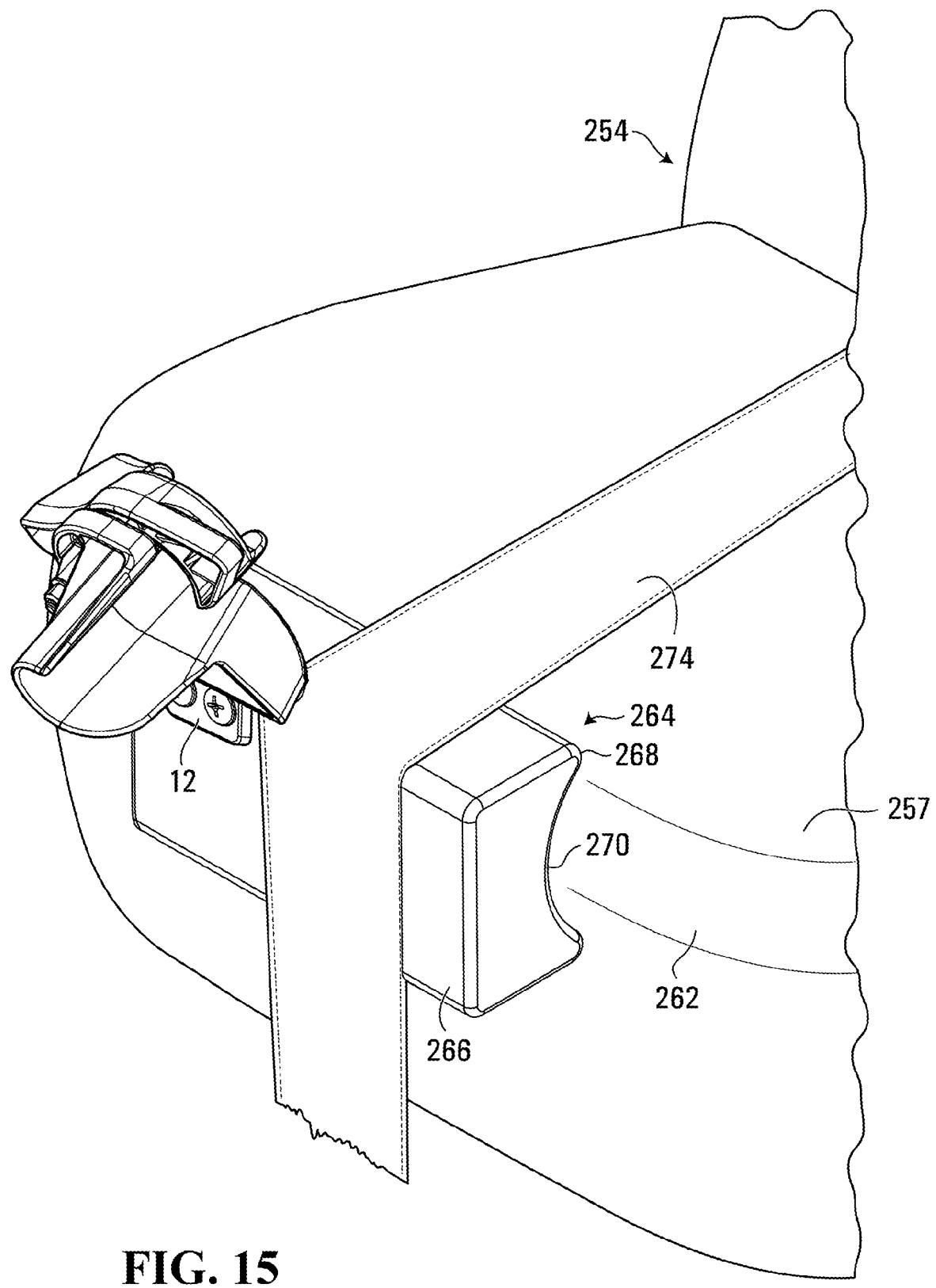
FIG. 15 illustrates one embodiment for securing the restraining device to a vehicle seat.

The exact manner of securing the holder 2 to the front edge 262 of the seat base 257 is implementation specific and is therefore not illustrated in detail in FIG. 14. However, for completeness, one example way is shown in greater detail in FIG. 15. In FIG. 15, the holder 2 is mounted to a base 264 via the mounting plate 12. The base 264 comprises a body having an upper face 266 and a lower face 268. The lower face 268 has a channel 270 defined therein for receiving the front edge 262 of the passenger's seat base 257. The front edge 262 of the seat base 257 is placed in the channel 270 so that the front edge 262 of the seat base 257 abuts against the lower face 268 of the base 264. A strap 274 is then used to tie or secure the base 264 to the passenger's seat 254. A groove (not illustrated) may be defined in the upper face 266 for receiving the strap 274.

An alternative embodiment is described with reference to FIGS. 16 to 20, in which an apparatus 302 is illustrated for securely supporting both the holder 2 and a tray 304 for holding mail. Specifically, the apparatus 302 comprises a supporting body that is securable to a seat of a vehicle, and the holder 2 connected to the supporting body.

Figure 16:
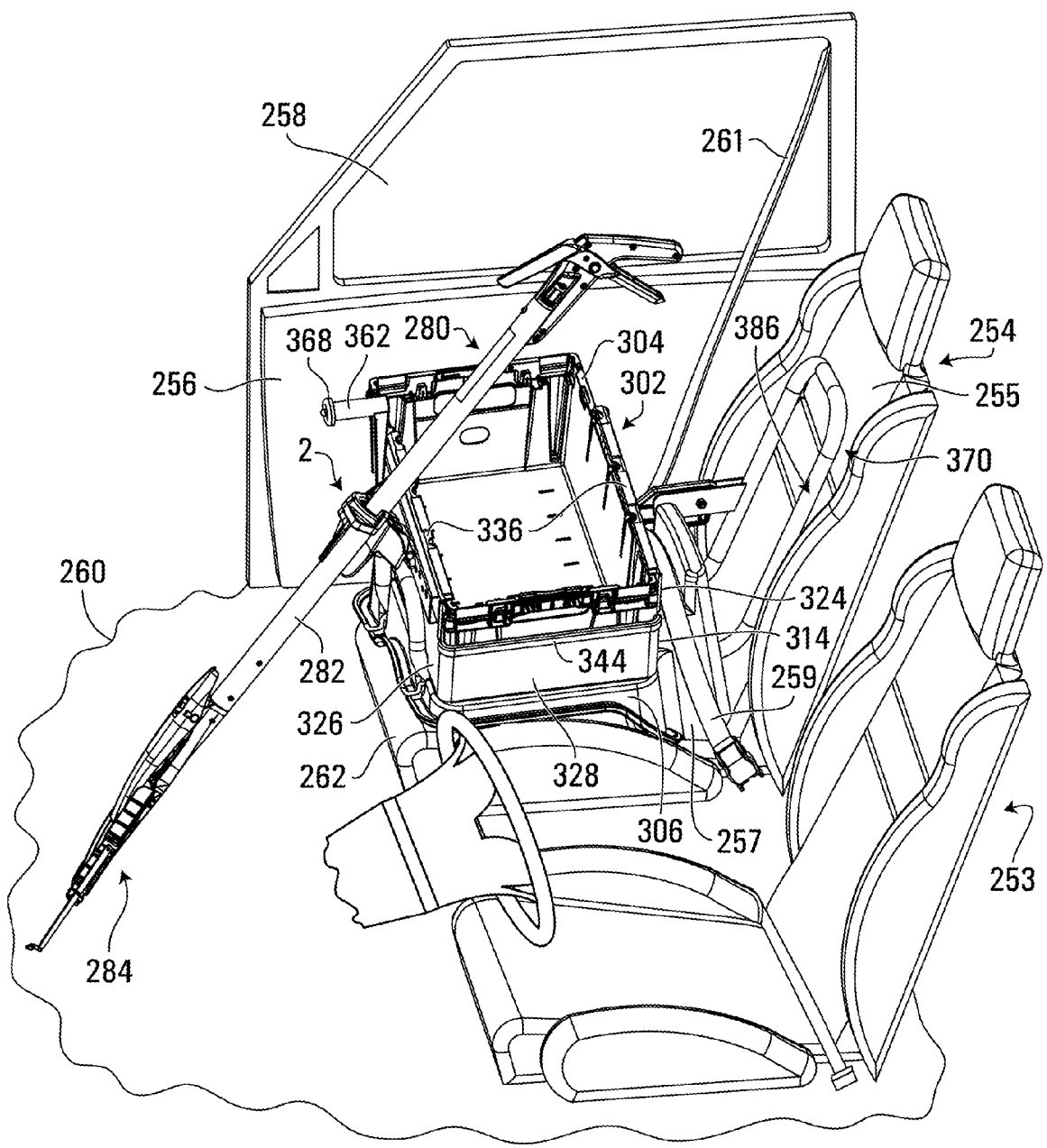
FIG. 16 illustrates another embodiment for securing the restraining device to a vehicle seat, and shows an embodiment of an apparatus for achieving this and for supporting and securing a tray of mail.
Figure 17:
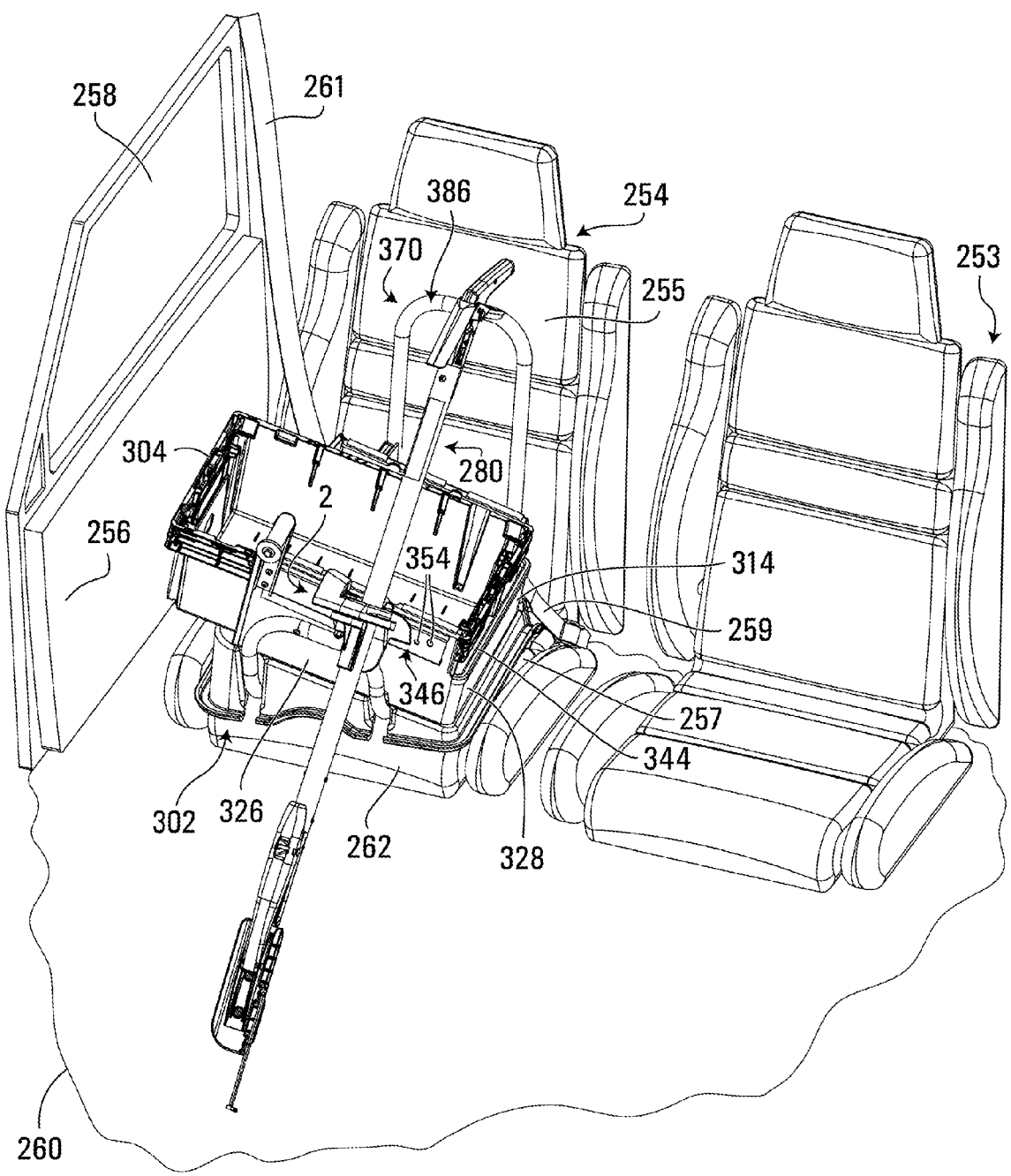
FIG. 17 illustrates FIG. 16 from another perspective.
Figure 18:
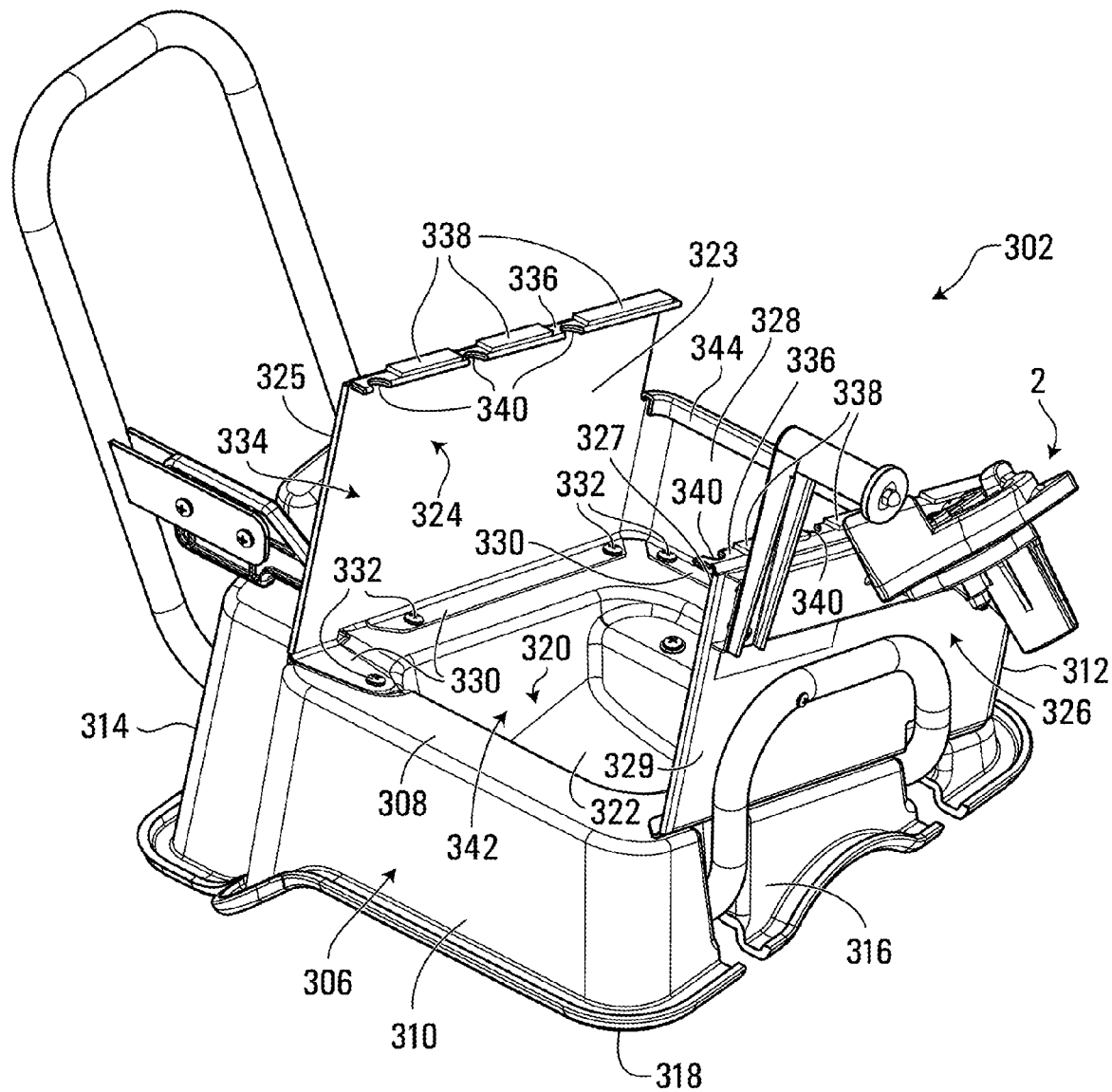
FIG. 18 shows the apparatus of FIG. 16 in isolation.

FIGS. 16 and 17 illustrate two perspective views (side and front respectively), in which the apparatus 302 is shown installed in the passenger's seat 254 with the holder 2 holding the reaching device 280. FIG. 18 illustrates a perspective view of the apparatus 302 shown in isolation without the tray 304.

With reference to FIG. 18, the apparatus 302 comprises a base 306 having a top surface 308 and four side surfaces 310, 312, 314, and 316. For ease of reference, the four side surfaces will be referenced in relation to the direction in which they face when the apparatus 302 is installed in the vehicle. That is, the four side surfaces will be referred to respectively as: (i) the side surface that faces the passenger's door 310; (ii) the side surface that faces the driver 312, which is opposite the side surface that faces the passenger's door 310; (iii) the side surface that faces the back of the passenger's seat 314; and (iv) the side surface that faces the front of the vehicle 316, which is opposite the side surface that faces the back of the passenger's seat 314.

As shown in FIG. 18, a lip 318 extends around the perimeter of the bottom of the base 306, that is, around side surfaces 310, 312, 314, and 316. The lip 318 helps to spread out the weight of the base 306, and helps to prevent the base 306 from digging into the material of the seat on which it is placed.

The top surface 308 of the base 306 has a depression 320 defined therein, which has a bottom surface 322. The bottom surface 322 of the depression 320 lies on substantially the same plane as the bottom of the lip 318, such that the bottom surface 322 of the depression 320 also contacts the seat on which the base 306 is placed to help spread out the weight of the base 306. The depression 320 may also be used to store items in the base 306.

Upstanding from the top surface 308 of the base 306 are two opposite sidewalls 324 and 326, which are on opposite sides of the depression 320. Sidewall 324 is approximately parallel to the side surface 314 of the base 306, and sidewall 326 is approximately parallel to side surface 316 of the base 306. As shown in FIG. 18, sidewall 324 has an inside surface 323 that faces the sidewall 326, as well as an opposite outside surface 325. Sidewall 326 has an inside surface 327 that faces the sidewall 324, as well as an opposite outside surface 329. An end wall 328 connects the two opposite sidewalls 324 and 326. In the illustrated embodiment, end wall 328 is substantially flush with the sidewall 312 of the base 306 and is shorter than sidewalls 324 and 326. The end wall 328 and each of the sidewalls 324 and 326 are secured to the top surface 308 of the base 306 via one or more feet 330, which each comprises a flat surface that extends perpendicular to the wall at the bottom of the wall and which is mounted to the top surface 308 of the base 306 via screws or bolts 332. The end wall 328 and sidewalls 324 and 326 may instead be integrally formed with the base 306 or secured to the base in another manner (e.g. using glue).

The sidewalls 324 and 326 define a channel 334 for receiving a tray (such as tray 304 in FIG. 16). With reference still to FIG. 18, in the illustrated embodiment, at the top of each of the sidewalls 324 and 326 is a ledge 336 that extends perpendicular to the sidewall and slightly over the channel 334. Each ledge 336 acts as an abutment surface that prevents a tray from vertically exiting the channel 334. Pads 338 are situated along the top surface of each ledge 336 in order to cushion the impact of any object that may come into contact with the top of the ledge 336 (such as an arm or hand of a person). In the illustrated embodiment, grooves 340 in the shape of half circles are spaced along the ledge 330 of each of sidewalls 324 and 326, and each groove 340 opens in the direction of the opposite sidewall. The grooves 340 allow for the insertion and removal of dividers (not shown), which may be placed in the tray 304 to divide the tray 304 into different sections.

Although a ledge 336 is specifically illustrated in the figures, instead another abutment surface or stop can be present on one or both of the sidewalls, which performs the same function as the ledge. That is, in general, an abutment surface or stop is present that mitigates or prevents movement (such as vertical movement) of a tray held between the sidewalls 324 and 326. In some embodiments, such an abutment surface can be as simple as a projecting portion or object.

The side of the channel 334 opposite the end wall 328 is open and defines the opening 342 of the channel 334. A tray is slid into the opening 342 of the channel 334 until the tray is supported by the top surface 308 of the base 306 and abuts against the end wall 328. This is shown, for example, in FIG. 16, in which the tray 304 is slid into channel and abuts against the end wall 328. Note that in the illustrated embodiment the end wall 328 is not as high as the sidewalls 324 and 326. This allows for a mail carrier (not shown) in the driver's seat 253 to more easily reach over the end wall 328 and access mail in the tray 304. A bumper 344 also extends along the top edge of the end wall 328, which cushions the impact of any object that may come into contact with the top edge of the end wall 328 (such as an arm or hand of a person).

Figure 19:
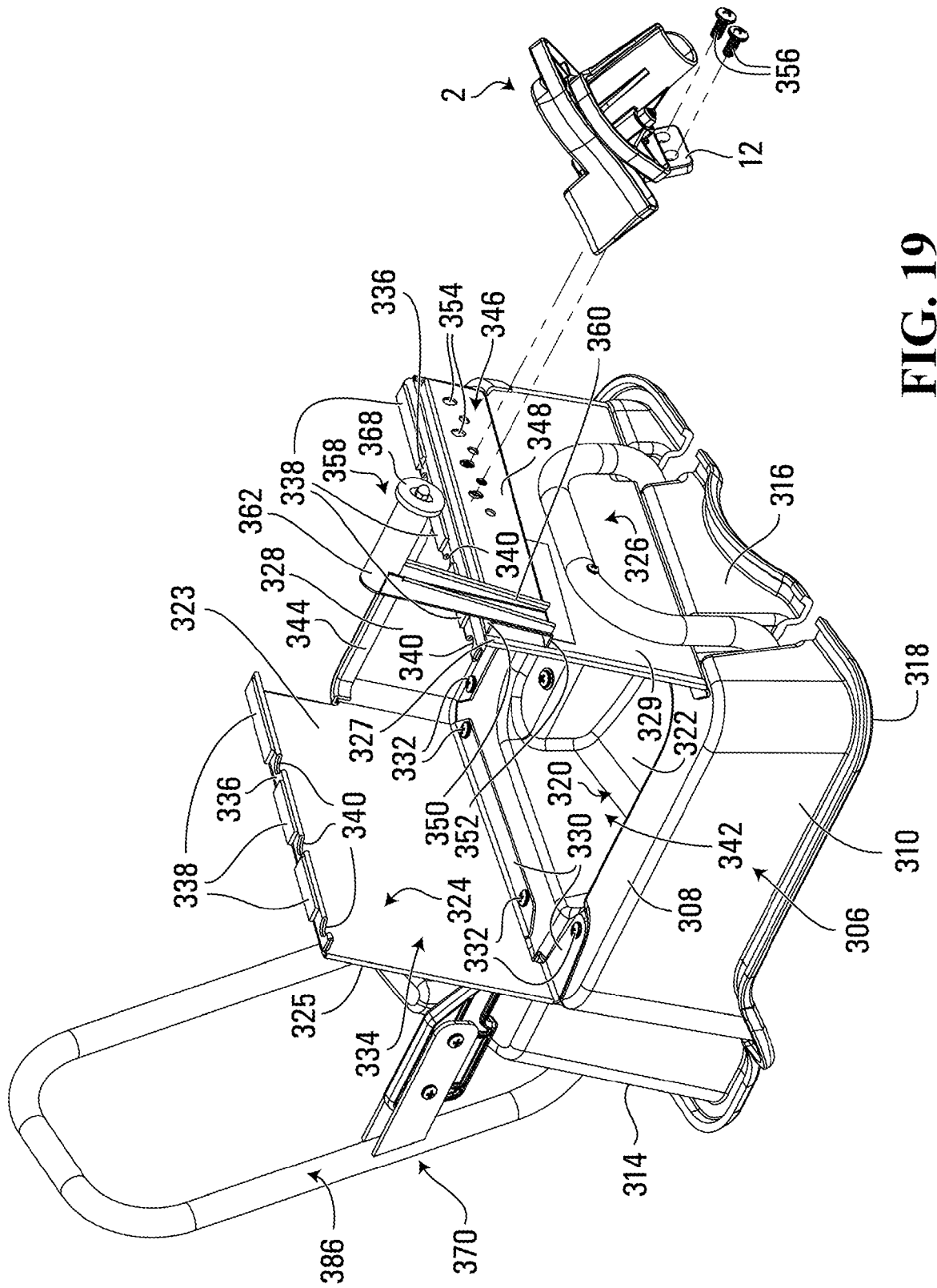
FIG. 19 illustrates FIG. 18 from another perspective, with the restraining device shown exploded from the apparatus.

Referring now to FIG. 19, the outside surface 329 of the sidewall 326 has connected thereto a mounting plate 346, to which the holder 2 is mounted. In the illustrated embodiment, the mounting plate 346 is elongated and U-shaped, having a front surface 348 and two opposite side surfaces 350 and 352 that run parallel to the top edge of the sidewall 326. A plurality of holes 354 in the front surface 348 of the mounting plate 346 allow for the holder 2 to be mounted at various locations along the mounting plate 346 using bolts 356. The bolts 356 are used to secure the mounting plate 12 of the holder 2 to the mounting plate 346 of the sidewall 326. The provision of a plurality of holes 354 in the mounting plate 346 allows for the holder 2 to be secured to the mounting plate 346 at a position that is most comfortable to the user. For example, if the person driving the vehicle and using the holder 2 has a short arm, the holder 2 may be secured closer to side surface 312 (i.e. closer to the driver's seat 253, as shown in FIG. 17). It will be appreciated that the mounting plate 346 is not needed in order to secure the holder 2 to the apparatus, but its inclusion in the illustrated embodiment allows for the holder 2 to be secured without the bolts 356 projecting through the sidewall 326. Also, the gap between the front surface 348 of the mounting plate 346 and the sidewall 326 makes it difficult for a user to remove the bolts 356 and thus remove the holder 2 once it is secured to the mounting plate 346. This is beneficial in applications in which it is desired to discourage the end user from removing the holder 2 once secured to the mounting plate 346 and/or in applications in which it is desired to discourage the end user from further adjusting the location of the holder 2 on the mounting plate 346, once the holder 2 is secured to the mounting plate 346. With reference still to FIG. 19, a handle 358 is also secured to the mounting plate 346. In the illustrated embodiment, the handle 358 is secured to the mounting plate 346 near the end of the mounting plate 346 on the side closest to side surface 310. The handle 358 comprises a staff 360 that extends vertically above the sidewall 326. An arm 362 is connected to the top of the staff 360 and extends perpendicular to the staff 360. In the illustrated embodiment, the arm 362 extends in a direction that is towards the front of the vehicle when the apparatus 302 is installed in the vehicle. The arm 362 has a proximal end that is connected to the staff 360 and a distal end. At the distal end of the arm 362 is a stop 368.

The handle 358 allows the apparatus 302 to be more easily moved, and therefore more easily carried and inserted into and removed from a vehicle. However, the handle 358 also serves another purpose. Specifically, the arm 362 of the handle 358 can be used to support a reaching device when the reaching device is being used to service a mail box. This will be explained and illustrated later with respect to FIG. 24.

Returning now to FIG. 18, it can be seen that in the illustrated embodiment the base 306 slopes downward towards side surface 312. That is, side surface 310 is higher than side surface 312. As a result, and as is best illustrated in FIG. 17, when the tray 304 is inserted, the tray 304 is sloped towards the driver's seat 253 due to the downward slope of the base 306 in the direction of the driver's seat 253. One benefit of such a design will be explained later. Returning again to FIG. 18, in some embodiments the base 306 may also slope slightly downward towards side surface 316. That is, side surface 314 may be higher than side surface 316 such that there is a downward slope in a direction from the sidewall 324 to the sidewall 326. The purpose of such a slope is to offset the opposite slope that is typical of a car seat. As shown in FIG. 14, the seat base 257 of the passenger's seat 254 is often at a higher point at its front edge 262 compared to the point at which the seat base 257 connects to the seat back 255. As is best shown in FIG. 16, the opposite slope of the base 306 therefore offsets the slope of the seat base 257, such that the tray 304 is not noticeably sloped towards or away from the front of the vehicle.

Figure 20:
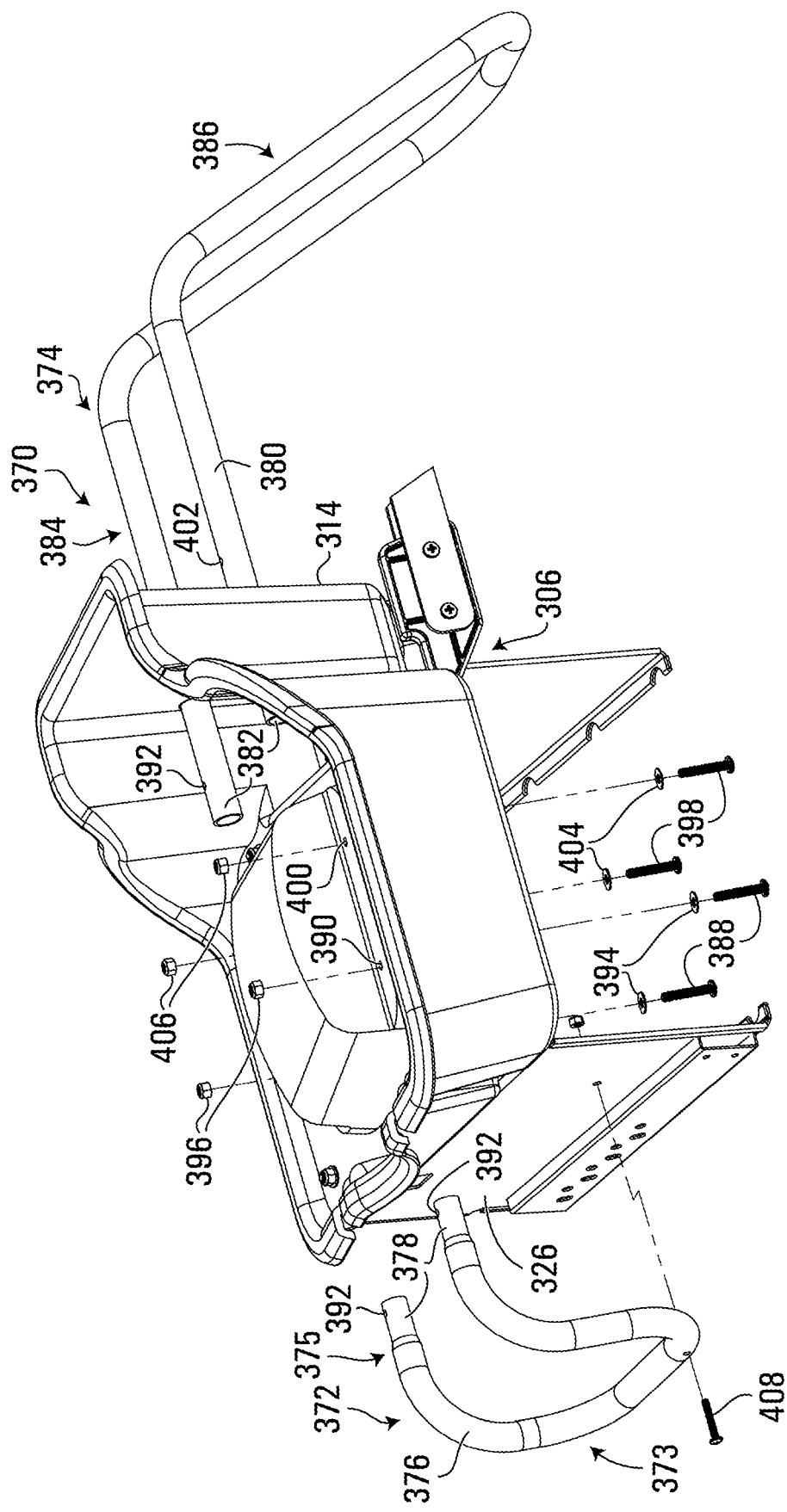
FIG. 20 illustrates an exploded view of reinforcement tubing of the apparatus of FIG. 16.

Referring now to FIGS. 19 and 20, the apparatus 302 also includes a reinforcement tubing 370. As is best shown in FIG. 20, the reinforcement tubing 370 comprises a first metal tubular portion 372, which is telescopically connected to a second metal tubular portion 374. Specifically, the first metal tubular portion 372 comprises a metal tube 376 having two ends 378. The tube 376 is bent in the shape of a "U", but with the portion of the tube 376 closer to the ends 378 gently bent approximately 90 degrees such that the ends 378 are facing approximately perpendicular to the "U". Therefore, the first metal tubular portion 372 comprises a section 373 that is parallel to the sidewall 326 (the "U" portion), and a section 375 that is approximately perpendicular to the sidewall 326. The ends 378 of the tube 376 are each reduced in diameter so that the ends 378 can be connected to the second metal tubular portion 374.

The second metal tubular portion 374 comprises another metal tube 380 that is longer than metal tube 376, and that also has two ends 382. The tube 380 is also bent in the shape of a "U", but is further gently bent at the top of the "U", such that the ends 382 face at an angle approximately 110 degrees or so from the "U" and are perpendicular to the sidewall 314 of the base 306 when installed. Therefore, the second metal tubular portion 374 comprises a section 384 perpendicular to the sidewall 314, and a section 386 (the "U") that extends away from the sidewall 314 at a slight angle when installed.

The ends 378 of the first tubular portion 372 are inserted into the ends 382 of the second tubular portion 374 so as to connect the two tubular portions together and form the reinforcement tubing 370. As illustrated in FIG. 20, bolts are used to secure the first tubular portion 372 to the second tubular portion 374, and are used to secure both of these portions to the base 306. Specifically, bolts 388 are inserted through holes 390 in the base 306 and through holes 392 in the ends 378 and 382 of the two tubular portions, and a washer 394 and nut 396 are then threaded onto each of the bolts 388.

Bolts 398 are also inserted through holes 400 in the base 306 and holes 402 in the second metal tubular portion 374, and a washer 404 and nut 406 are then threaded onto each of the bolts 398. As shown in FIG. 20, another bolt 408 is used to secure the section 373 of the first metal tubular portion parallel to the sidewall 326 to the sidewall 326.

FIG. 19 illustrates the reinforcement tubing 370 installed and connected to the base 306. The primary purpose of the reinforcement tubing 370 is to reinforce the base 306. However, as shown in FIGS. 16 and 17, when the apparatus 302 is installed in the vehicle, the "U"-shaped section 386 of the reinforcement tubing 370 extends upwards adjacent to and at an angle from the base and abuts against the seat back 255 of the passenger's seat 254. Because the "U"-shaped section 386 extends away from the sidewall 314 at a slight angle, it more naturally follows and abuts against the seat back 255. As discussed later, the "U"-shaped section 386 helps prevent the apparatus 302 from projecting towards the seat back 255 in the event of a collision.

Figure 21:
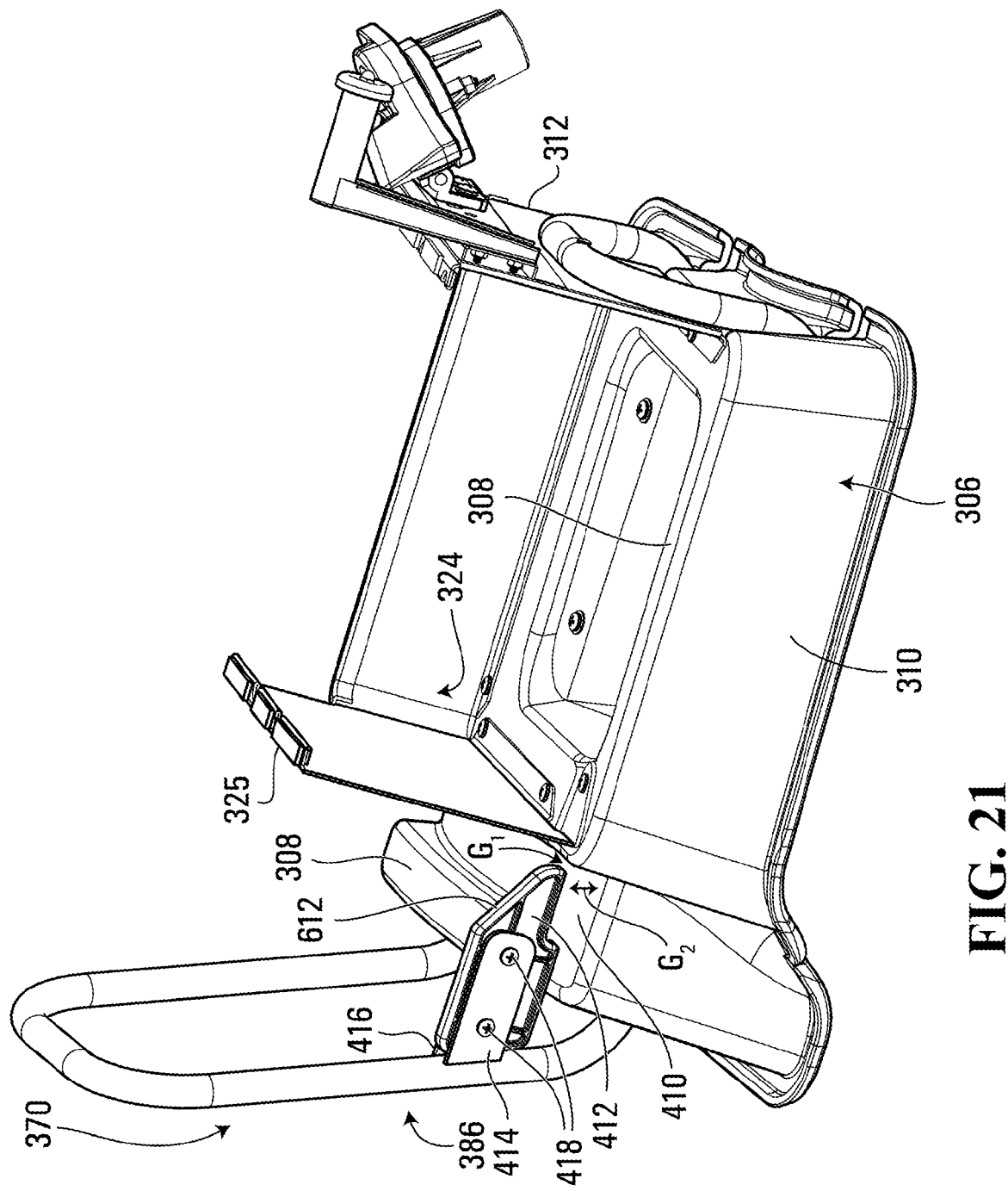
FIG. 21 illustrates FIG. 18 from yet another perspective.

Turning now to FIG. 21, as is best shown in the figure, the top surface 308 of the base 306 adjacent the outside surface 325 of sidewall 324 has a depression or groove 410 defined therein, that runs approximately parallel to the sidewall 324, and that extends from the sidewall 310 of the base 306 to the sidewall 312 of the base 306. The groove 410 is for receiving a passenger's seat belt, which is used to secure the base 306 to the passenger's seat. An arm 612 is connected to the U"-shaped section 386 of the reinforcement tubing 370 on the side closest to the sidewall 310 of the base 306, and at a point just above the top surface 308 of the base 306. The arm 612 extends perpendicular to the length of the groove 410 and just above the groove 410. The arm 612 terminates just before reaching the end of the groove 410, thereby defining a gap G1. Another gap G2 is defined between the bottom surface of the arm 612 and the bottom of the groove 410.

In the illustrated embodiment, the arm 612 is mounted as follows. Two opposite mounting plates 414 and 416 are each secured to opposite sides of the tube closest to the side wall 310 of the U"-shaped section 386 of the reinforcement tubing 370. Bolts 418 are used to clamp the arm 612 between the two mounting plates 414 and 416. A benefit of this design is two-fold: it allows the arm 612 to be more securely mounted to the reinforcement tubing 370, and it allows for easier replacement or substitution of the arm 612.

Figure 22:
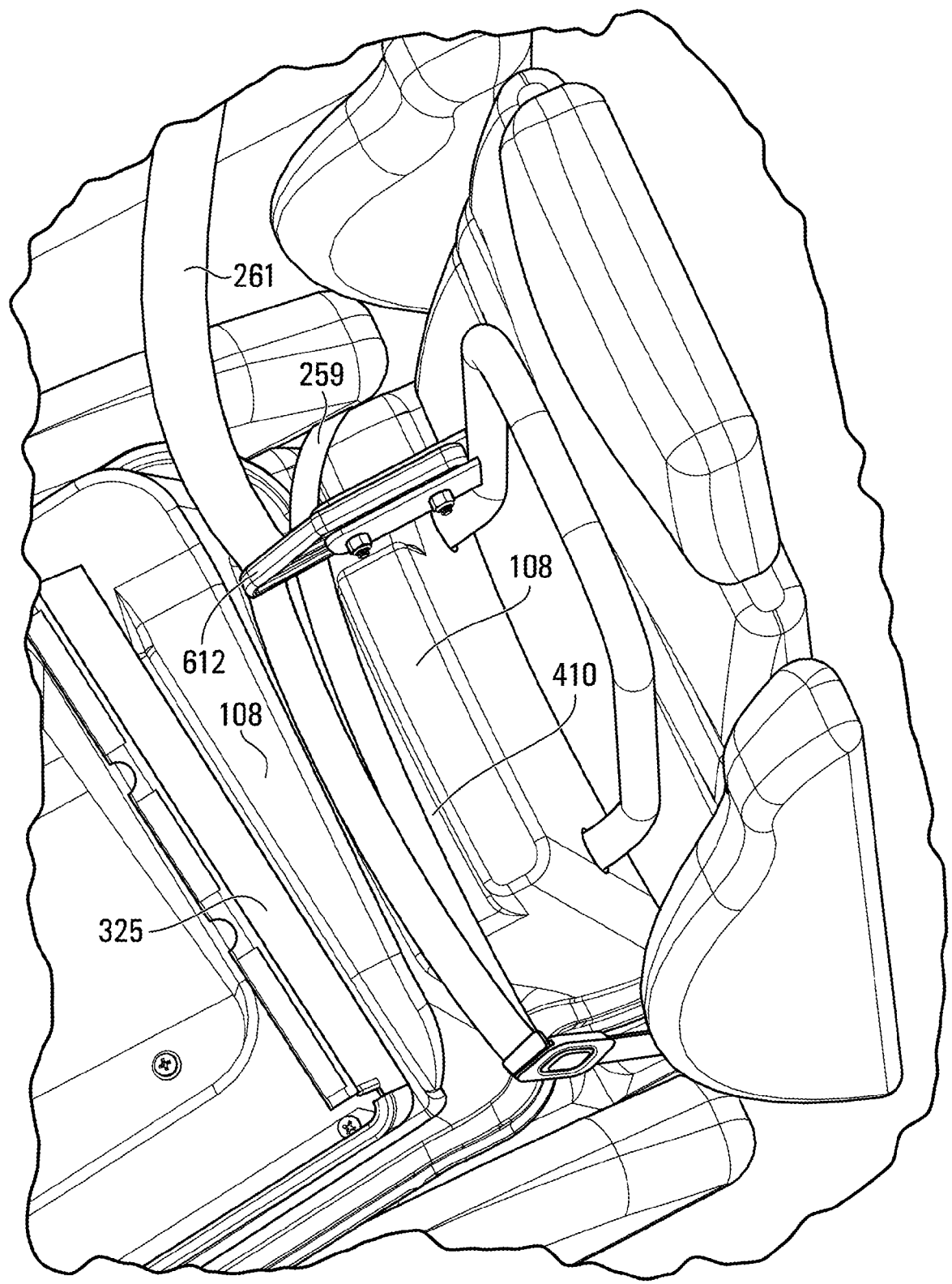
FIG. 22 illustrates a top perspective view of the apparatus of FIG. 16, with a focus on the seat belt connection.

To secure the base 306 to a passenger's seat using a passenger's seat belt, both a lap strap and a shoulder strap of the seat belt are fed through gap G2 (via gap G1). FIG. 22 illustrates the result of this, showing both the shoulder strap 261 and the lap strap 259 fitted in the groove 410. As is shown in this figure, the arm 612 restrains the shoulder strap 261, which will otherwise naturally want to lift out of the groove 410.

One specific securing mechanism for securing the apparatus 302 to a vehicle seat using a seat belt is explained above in relation to FIGS. 21 and 22.

However, other securing mechanisms are possible and may instead be used. For example, in an alternative embodiment, the arm 612 and groove 410 are not present, and instead the seat belt is fed through an orifice in the base 306 (not illustrated). In another embodiment (also not illustrated), the seat belt may secure the apparatus 302 by harnessing or holding the reinforcement tubing 370.

Use of the apparatus 302 will now be described.

With reference to FIG. 16, before installing the apparatus 302 in the vehicle, the passenger's seat 254 is preferably positioned as far back as possible, to provide the maximum amount of room in the footwell area of the floor 260, and to allow easy access to the passenger's window 258. In addition, the seat back 255 of the passenger's seat 254 is preferably positioned to slope back at an angle of about 10% to match the slope of the reinforcement tubing 370. The apparatus 302 is then placed on the passenger's seat 254 as shown in FIG. 16, with the portion 386 of the tubing 370 pushed up against the seat back 255 of the passenger's seat 254. The shoulder strap 261 and lap strap 259 of the passenger's seat belt are then thread through the groove 410 (as best shown in FIG. 22), so as to secure the apparatus 302 to the passenger's seat 254. Returning again to FIG. 16, the tray 304 is then placed into the apparatus 304 (as shown in FIG. 16), and mail (not shown in FIG. 16) is placed into the tray 304. The reaching device 280 is then snapped into the holder 2, with the jaw 284 of the reaching device 280 resting against the floor 260.

Once installed, and during use, the mail carrier can use the apparatus 302 as follows.

With reference to FIG. 23, illustrated again is the vehicle interior 252, but with a mail carrier 502 in the driver's seat 253. The apparatus 302 is secured in the passenger's seat 254 in the manner explained above. Mail 504 is present in the tray 304.

The vehicle has pulled up in front of a mail box 506, which the mail carrier 502 would like to service by placing some of the mail 504 into the mail box 506. The mail carrier 502 therefore first removes the reaching device 280 from the holder 2 by opening the arm 6 of the holder 2 in the manner explained with reference to FIG. 9. The mail carrier 502 then reaches the reaching device 280 through the passenger's window 258 and uses the hook 285 to open the mail box 506.

Once the mail box 506 is opened, some of the mail 504 from the tray 304 is then placed into the jaw 284 of the reaching device 280, and is deposited into the mail box 506 using the reaching device 280. The slope of the tray 304 towards the driver's seat 253 allows for the mail carrier 502 to more easily access the mail 504, and causes (through gravity) the mail 504 to naturally want to remain at the side of the tray 304 closest to the driver's seat 253.

The reaching device 280 itself has many features which assist in servicing a mail box. The use of the reaching device 280 and these features are described in detail in U.S. patent application Ser. No. 13/490,583 and Canadian Patent Application No. 2,753,232.

Figure 24:
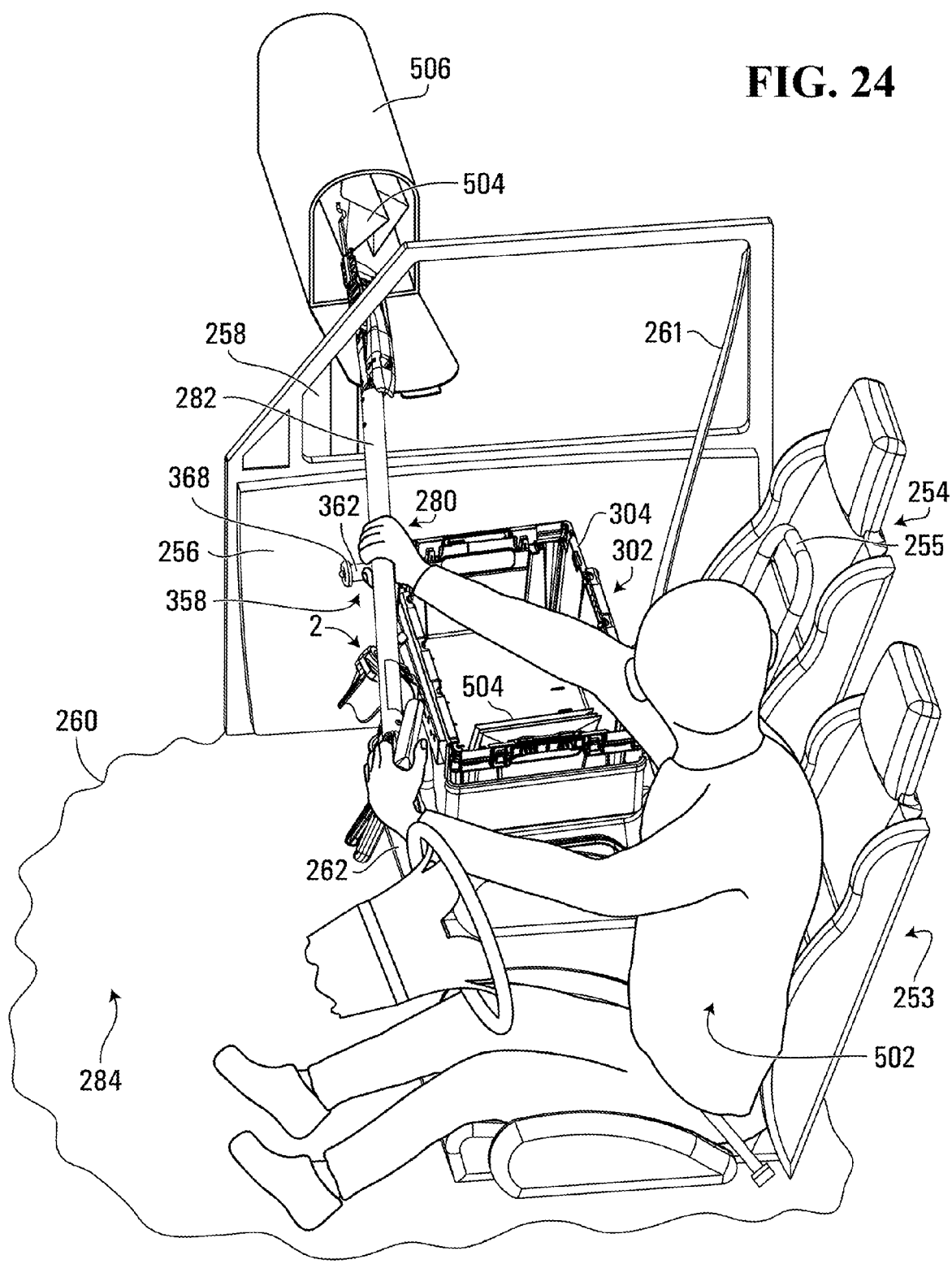

As shown in FIG. 24, when the mail carrier 502 is reaching through to the mail box 506 to service the mail box 506, the arm 362 of the handle 358 of the apparatus 302 can be used to support the shaft 282 of the reaching device 280. The stop 368 at the distal end of the arm 362 prevents the shaft 282 from slipping off the distal end of the arm 362. Please note that the illustration in FIG. 24 is somewhat simplified for ease of reference. In particular, FIG. 24 is not meant to necessarily illustrate or instruct a mail carrier on the most ergonomic way of handling the reaching device 280.

When the mail carrier 502 is finished with the reaching device 280, the mail carrier 502 can simply snap the shaft 282 of the reaching device 280 back into the holder 2 in the manner described earlier with reference to FIG. 11.

Figure 23:
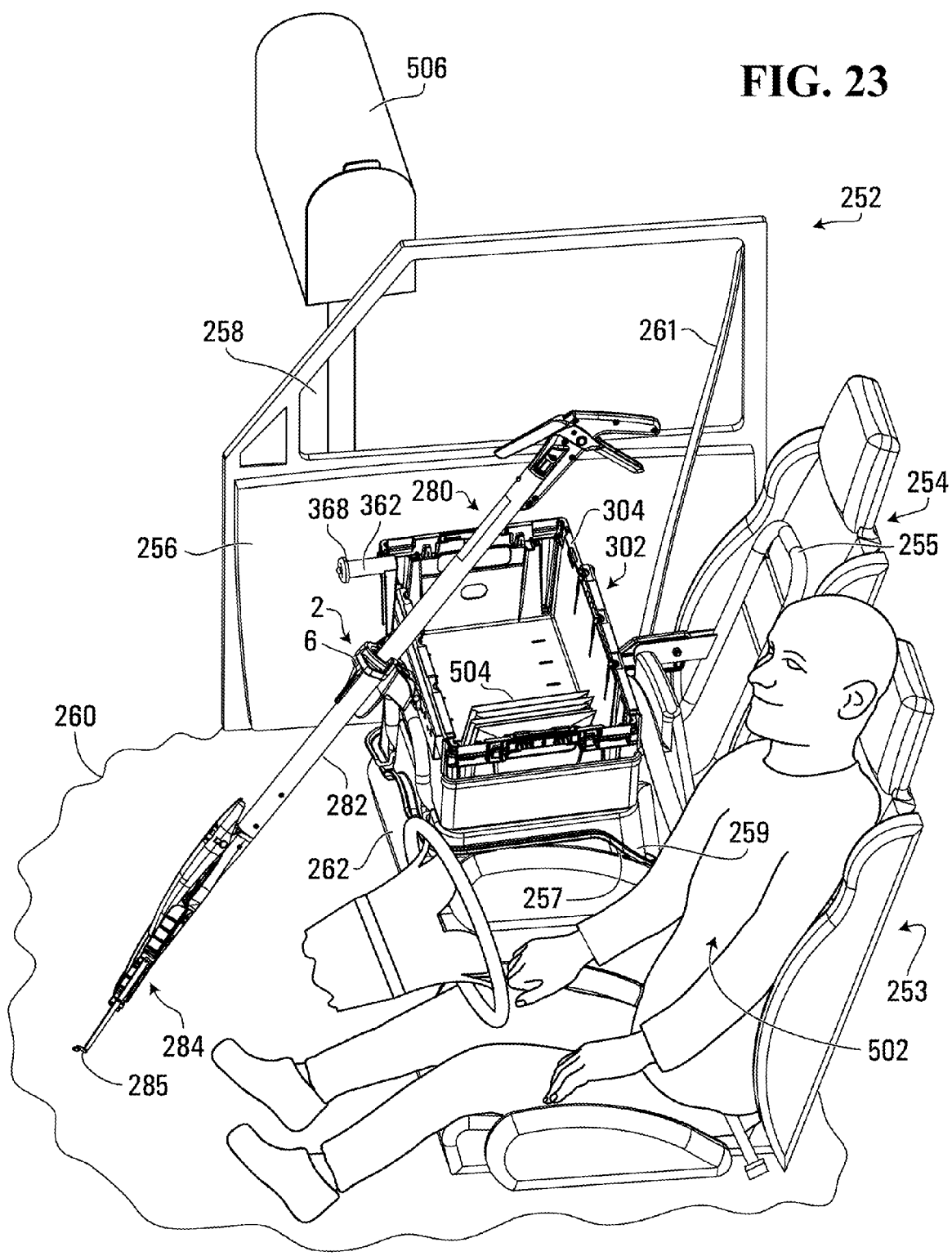
FIGS. 23 and 24 illustrate use of the reaching device and the apparatus of FIG. 16 by a rural mail carrier.

While driving, if the mail carrier is involved in a collision, the apparatus 302 and reaching device 280 are secured in a way that aims to mitigate the damage they may cause the mail carrier. This may be achieved by some or all of the following features:

1) The apparatus 302 is secured using the passenger's seat belt in the manner shown with reference to FIG. 22. This prevents the apparatus 302 from projecting out of the seat in the event of a collision.
2) The "U"-shaped section 386 of the reinforcement tubing 370 abuts against the seat back 255 of the passenger's seat 254, as best shown in FIGS. 16 and 17. This helps in preventing the apparatus 302 from projecting towards the seat back 255 in the event of a collision.
3) As is best shown in FIG. 16, the ledge 336 of the sidewalls 324 and 326 prevents the tray 304 from exiting the apparatus 302 vertically, which prevents the tray 304 from vertical projection in the event of a collision. Moreover, the opening 342 of the channel 334 (shown in FIG. 18) faces the direction opposite the driver's seat, so that if the tray were to project from the channel 334, it could only project in the direction opposite the mail carrier. Thus, the end wall 328 and the ledge 336 prevents movement of the tray in an undesirable direction.
4) As shown in FIG. 12, the shaft of the reaching device (shaft 122 in this figure) is only loosely held by the holder 2, such that a force applied to the shaft 122 at a point above the holder 2 in a direction opposite the direction in which the channel 38 opens (i.e. force F1) will allow for movement of the shaft. As can be seen in FIG. 23, the force F1 would be in the direction away from the mail carrier 502. Therefore, if in the event of a collision a flailing arm or other body part of the mail carrier 502 hits the shaft in the direction F1, the reaching device 280 will move so as to lessen the impact compared to if the reaching device 280 was firmly held. However, as explained with reference to FIG. 13, when a force is applied at a point above the holder 2 in a direction in which the channel 38 opens (i.e. force F2), the guard 42 will prevent movement of the shaft. As can be seen in FIG. 23, the force F2 would be in the direction towards the mail carrier 502. Therefore, if in the event of a collision a flailing arm or other object hits the shaft in the direction F2, the reaching device 280 will not move towards the mail carrier 502.

The apparatus 302 explained with reference to FIGS. 16 to 24 is a specific example of the general structure provided by such a device. More generally, the apparatus 302 simply comprises a supporting body (such as base 306) that is securable to a seat of a vehicle. The supporting body does not have to be secured to the seat of the vehicle using a seat belt, but could instead be secured in another way (e.g. using a strap or using a supporting body that is shaped or weighted so as to restrict movement on the seat). However, in some embodiments, the supporting body is secured using a seat belt securing mechanism. One such mechanism is explained with reference to FIGS. 21 and 22.

A restraining device, such as holder 2, is connected to the supporting body and is for restraining the reaching device when not in use. In some embodiments, the supporting body further supports a tray for holding mail. In the embodiment illustrated in the figures, this is accomplished by using two opposite walls upstanding from the base. The tray is received between the two opposite walls. However, in other embodiments the tray may be supported in other ways. For example, the tray may instead be integrally formed with the supporting body or fastened thereto (either permanently or detachably). Depending upon how the tray is supported, an abutment surface or stop may be needed or desirable to mitigate vertical movement of the tray.

The holder 2 need not be connected to a side wall, as shown in FIGS. 16 to 24. Instead, it may be connected to another area of the supporting body.

In some embodiments, the supporting body includes or has extending therefrom a seat back abutment surface for abutment against a seat back when the apparatus is installed in the seat. The "U"-shaped section 386 of the reinforcement tubing 370 is an example of such a seat back abutment surface. However, other seat back abutment surfaces may instead be used, such as a planar or curved surface that abuts against and/or follows the seat back when the apparatus is installed in the seat.

Thus, the apparatus 302 is not limited to the specific structure illustrated. As is clear from the above, the same holds true for the restraining device 2.

Additionally, even though the illustrated embodiments include a combination of structures and/or mechanisms allowing for multiple benefits, it will be appreciated that each one of these structures/mechanisms has advantages in and of itself, and that embodiments are contemplated in which only some of the structure and/or mechanisms are present. Consider the holder 2, for example. In some embodiments, both the thumb-receiving surface and the finger-receiving surface need not be present. In other embodiments, only one of these surfaces may be present. In some embodiments, the guard may not be present. In some embodiments, the guiding surface may not be present. Other features present in the illustrated embodiment may not be present in all contemplated embodiments. Consider also the apparatus 302, for example. In some embodiments, the tray support may not be present. In some embodiments, the seat belt securing mechanism may not be present. In some embodiments, features such as the lip, the reinforcement tubing, and/or the handle may not be present. Other features present in the illustrated embodiment may not be present in all contemplated embodiments.

Thus, various modifications will be apparent to those skilled in the art without departing from the scope of the claims appended hereto.

As a final point, it will be appreciated that in some embodiments the holder 2 and/or apparatus 302 may be shipped or provided partially assembled (e.g. in a kit), with the full assembly being completed prior to use. As one example, the arm 6 of the holder 2 may be provided unassembled from the base 4 of the holder 2. As another example, the holder 2 may initially be provided unconnected to the apparatus 302. As another example, the walls 324 and 326 may not be attached to the apparatus 302 until immediately before the apparatus is provided to or used by a mail carrier.

Various embodiments will now be summarized more generally.

In one embodiment, there is provided a restraining device comprising: a base and an arm pivotally connected to the base, at least one of the base and the arm defining a channel for receiving a shaft to be restrained by the restraining device; the arm pivotable around a pivoting axis between an open position for permitting entry of the shaft into the channel, and a closed position in which the arm restrains the shaft in the channel; the arm comprising at least one of: a thumb-receiving surface for receiving a force by a thumb to pivot the arm from the closed position to the open position; and a finger-receiving surface for receiving a force by at least one finger to pivot the arm from the closed position to the open position.

In some embodiments, the arm comprises a claw that extends across the channel when the arm is in the closed position.

In some embodiments, the arm comprises the thumb-receiving surface, and the thumb-receiving surface is connected to the claw.

In some embodiments, the arm comprises the finger-receiving surface, and the arm further comprises a fin. The claw and the fin are each on opposite sides of the pivoting axis, and the fin comprises the finger-receiving surface.

In some embodiments, the arm comprises both the thumb-receiving surface and the finger-receiving surface. The thumb-receiving surface and the finger-receiving surface are on opposite sides of the pivoting axis, and the thumb-receiving surface and the finger-receiving surface face in different directions from each other.

In some embodiments, the thumb-receiving surface and the finger-receiving surface face in substantially opposite directions from each other.

In some embodiments, the arm comprises a claw and a fin. The claw and the fin are each on opposite sides of the pivoting axis. One side of the fin defines the finger receiving surface, and a portion of the claw facing in a direction substantially opposite the one side of the fin defines the thumb receiving surface.

In some embodiments, when in the closed position, the arm extends across the channel and towards the base, leaving a gap between an end of the arm and the base. The gap is smaller than a diameter of the shaft.

In some embodiments, the end of the arm comprises a shaft-receiving surface adapted to receive a force applied by a shaft being snapped into the channel when the arm is in the closed position. The force causes the arm to pivot open.

In some embodiments, the restraining device comprises a guard for constraining movement of a portion of the shaft in one direction away from a longitudinal axis of the channel more than in another direction away from the longitudinal axis when the shaft is received in the channel and restrained by the arm in the closed position.

In another embodiment, there is provided a restraining device comprising: a base and an arm movably connected to the base, at least one of the base and the arm defining a channel for receiving a shaft to be restrained by the restraining device, the channel having a longitudinal axis, and the arm being movable between an open position for permitting entry of the shaft into the channel, and a closed position in which the arm loosely restrains the shaft in the channel; and a guard for constraining movement of a portion of the shaft in one direction away from the longitudinal axis more than in another direction away from the longitudinal axis when the shaft is received in the channel and loosely restrained by the arm.

In some embodiments, the channel is defined in the base and the guard is connected to or integrally formed with the base and forms part of the channel.

In some embodiments, the channel is defined by opposite ends, each of the ends on an opposite side of a plane perpendicular to the longitudinal axis of the channel. Additionally, the arm, when in the closed position, is closer to one of the opposite ends.

In some embodiments, the arm further comprises an inner surface that faces the longitudinal axis when the arm is in the closed position, and at least a portion of the guard and at least a portion of the inner surface of the arm are on opposite sides of the longitudinal axis when the arm is in the closed position.

In some embodiments, said at least a portion of the guard extends downward from the base and is offset from and below said at least a portion of the inner surface of the arm when the arm is in the closed position.

In some embodiments, said portion of the shaft is the portion of the shaft below the arm.

In some embodiments, the base comprises an upper surface and an opposite lower surface, and the channel extends between the upper surface and the lower surface. The guard extends downward from the lower surface.

In some embodiments, the channel is defined by an arcuate surface, and the guard also comprises an arcuate surface that is integrally formed with the arcuate surface that defines the channel.

In some embodiments, the arm is pivotally connected to the base and is pivotable around a pivoting axis between the open position and the closed position.

In some embodiments, the arm further comprises at least one of: a thumb-receiving surface for receiving a force by a thumb to pivot the arm from the closed position to the open position; and a finger-receiving surface for receiving a force by at least one finger to pivot the arm from the closed position to the open position.

In some embodiments, the guard does not constrain the movement of the portion of the shaft in said another direction away from the longitudinal axis.

In another embodiment, there is provided an apparatus comprising: a supporting body securable to a seat of a vehicle; and the restraining device of any one of the embodiments described above, connected to the supporting body.

In some embodiments, the supporting body comprises a base and two opposite walls upstanding from the base. The two opposite walls are for receiving therebetween a tray for holding mail.

In some embodiments, the restraining device is connected to one of said opposite walls.

In some embodiments, at least one of the two opposite walls has an abutment surface extending therefrom. The abutment surface is for mitigating movement of the tray when the tray is received between the two opposite walls.

In another embodiment, there is provided an apparatus comprising: a supporting body securable to a seat of a vehicle, the supporting body for supporting a tray for holding mail; a restraining device connected to the supporting body, the restraining device for restraining a reaching device.

In some embodiments, the supporting body comprises a base and two opposite walls upstanding from the base. The two opposite walls are for receiving therebetween the tray for holding mail.

In some embodiments, the two opposite walls comprise: a first wall that is adapted to be positioned closer to a front of a vehicle when the apparatus is secured to the seat of the vehicle, and a second wall that is adapted to be positioned closer to a seat back of the seat of the vehicle when the apparatus is secured to the seat of the vehicle.

In some embodiments, the restraining device is connected to the first wall.

In some embodiments, the apparatus further comprises a handle connected to the first wall. The handle comprises an arm adapted to support a shaft of the reaching device during use of the reaching device.

In some embodiments, the apparatus further comprises an end wall interposed between the first wall and the second wall. At least one of the first wall and the second wall has an abutment surface extending therefrom. The end wall and the abutment surface are for mitigating movement of the tray when the tray is received between the first wall and the second wall.

In some embodiments, the base is sloped and the slope comprises at least one of: (i) a downward slope in a direction of a driver's seat when the apparatus is positioned in a passenger's seat of a vehicle; and (ii) a downward slope in a direction from the second wall towards the first wall.

In some embodiments, the apparatus further comprises a seat back abutment surface for abutment against a seat back when the apparatus is installed in the seat.

In some embodiments, the apparatus further comprises reinforcement tubing extending through the supporting body and upward adjacent to and at an angle from the supporting body. At least a portion of the reinforcement tubing forms the seat back abutment surface.

In some embodiments, the supporting body includes a securing mechanism for securing the supporting body to the seat using a seat belt.

The invention claimed is:

1. A restraining device comprising:
   a base and an arm pivotally connected to the base, at least one of the base and the arm defining a channel for receiving a shaft to be restrained by the arm of the restraining device;
   the arm pivotable around a pivoting axis between an open position for permitting entry of the shaft into the channel, and a closed position in which the arm restrains the shaft in the channel;
   the arm biased to remain in the closed position and to return to the closed position when in the open position;
   the arm comprising
      a thumb-receiving surface for receiving a force by a thumb to pivot the arm from the closed position to the open position and
      a finger-receiving surface for receiving a force by at least one finger to pivot the arm from the closed position to the open position;
   wherein an end of the arm further comprises a shaft-receiving surface adapted to receive a force applied by a shaft being snapped into the channel when the arm is in the closed position; the force applied by the shaft causing the arm to pivot open, and the arm biased to return to the closed position once the force applied by the shaft on the shaft-receiving surface is removed; wherein the thumb receiving surface is on one end of the arm and the finger-receiving surface is on the other end of the arm;
   wherein the arm comprises a claw that extends across the channel when the arm is in the closed position.

2. The restraining device of claim 1, and the thumb-receiving surface is connected to the claw.

3. The restraining device of claim 1, and the arm further comprises a fin; wherein the claw and the fin are each on opposite sides of the pivoting axis, and wherein the fin comprises the finger-receiving surface.

4. The restraining device of claim 1, wherein:
   the thumb-receiving surface and the finger-receiving surface are on opposite sides of the pivoting axis; and
   the thumb-receiving surface and the finger-receiving surface face in different directions from each other.

5. The restraining device of claim 4, wherein the thumb-receiving surface and the finger-receiving surface face in substantially opposite directions from each other.

6. The restraining device of claim 5, wherein the arm comprises a fin; wherein the claw and the fin are each on opposite sides of the pivoting axis, and wherein one side of the fin defines the finger receiving surface and a portion of the claw facing in a direction substantially opposite the one side of the fin defines the thumb receiving surface.

7. The restraining device of claim 1, wherein when in the closed position, the arm extends across the channel and towards the base, leaving a gap between the end of the arm and the base; the gap smaller than a diameter of the shaft.

8. The restraining device of claim 7, wherein the shaft-receiving surface is adjacent to the gap.

9. The restraining device of claim 1, wherein the restraining device comprises a guard for constraining movement of a portion of the shaft in one direction away from a longitudinal axis of the channel more than in another direction away from the longitudinal axis when the shaft is received in the channel and restrained by the arm in the closed position.

10. The apparatus of claim 1 further comprising:
    a supporting body that is connected to the restraining device and that is securable to a seat of a vehicle.

11. The apparatus of claim 10, wherein the supporting body comprises a base and two opposite walls upstanding from the base, the two opposite walls for receiving therebetween a tray for holding mail.

12. The apparatus of claim 11, wherein the restraining device is connected to one of said opposite walls.

13. The apparatus of claim 11, wherein at least one of the two opposite walls has an abutment surface extending therefrom; the abutment surface for mitigating movement of the tray when the tray is received between the two opposite walls.

14. The restraining device of claim 1, wherein the arm is spring-biased.

15. A restraining device comprising:
    a base and an arm movably connected to the base, at least one of the base and the arm defining a channel for receiving a shaft to be restrained by the arm of the restraining device, the channel having a longitudinal axis, and the arm being movable between an open position for permitting entry of the shaft into the channel, and a closed position in which the arm loosely restrains the shaft in the channel; and
    a guard for constraining movement of a portion of the shaft in one direction away from the longitudinal axis more than in another direction away from the longitudinal axis when the shaft is received in the channel and loosely restrained by the arm;

wherein the base comprises an upper surface and an opposite lower surface, and the channel extends between the upper surface and the lower surface; and wherein the guard extends downward from the lower surface;

wherein the arm is pivotally connected to the base and is pivotable around a pivoting axis between the open position and the closed position;

the arm further comprising
- a thumb-receiving surface for receiving a force by a thumb to pivot the arm from the closed position to the open position and
- a finger-receiving surface for receiving a force by at least one finger to pivot the arm from the closed position to the open position and wherein the thumb receiving surface is on one end of the arm and the finger-receiving surface is on the other end of the arm.

16. The restraining device of claim 15, wherein the channel is defined in the base and the guard is connected to or integrally formed with the base and forms part of the channel.

17. The restraining device of claim 15, wherein the channel is defined by opposite ends, each of the ends on an opposite side of a plane perpendicular to the longitudinal axis of the channel; and wherein the arm, when in the closed position, is closer to one of the opposite ends.

18. The restraining device of claim 15, wherein the arm further comprises an inner surface that faces the longitudinal axis when the arm is in the closed position, and at least a portion of the guard and at least a portion of the inner surface of the arm are on opposite sides of the longitudinal axis when the arm is in the closed position.

19. The restraining device of claim 18,
wherein said at least a portion of the guard extends downward from the base and is offset from and below said at least a portion of the inner surface of the arm when the arm is in the closed position.

20. The restraining device of claim 15, wherein said portion of the shaft is the portion of the shaft below the arm.

21. The restraining device of claim 15, wherein the channel is defined by an arcuate surface, and wherein the guard also comprises an arcuate surface that is integrally formed with the arcuate surface that defines the channel.

22. The restraining device of claim 15, wherein the guard does not constrain the movement of the portion of the shaft in said another direction away from the longitudinal axis.

* * * * *